(12) United States Patent
Gendler

(10) Patent No.: US 7,321,864 B1
(45) Date of Patent: Jan. 22, 2008

(54) SYSTEM AND METHOD FOR PROVIDING FUNDING APPROVAL ASSOCIATED WITH A PROJECT BASED ON A DOCUMENT COLLECTION

(75) Inventor: Joseph Gendler, Fair Lawn, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 343 days.

(21) Appl. No.: 09/705,486

(22) Filed: Nov. 3, 2000

Related U.S. Application Data

(60) Provisional application No. 60/163,506, filed on Nov. 4, 1999.

(51) Int. Cl.
G06F 9/44 (2006.01)

(52) U.S. Cl. ......................................................... 705/7
(58) Field of Classification Search .................... 705/7, 705/8, 1, 10; 382/789; 918/5
See application file for complete search history.

(56) References Cited

U.S. PATENT DOCUMENTS

| | | |
|---|---|---|
| 3,896,266 A | 7/1975 | Waterbury |
| 3,938,091 A | 2/1976 | Atalla et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |

(Continued)

FOREIGN PATENT DOCUMENTS

| | | | |
|---|---|---|---|
| DE | 0387462 | * | 9/1990 |

(Continued)

OTHER PUBLICATIONS www.projectmanagement.com—Project management web site archived on May 20, 2000.*

(Continued)

*Primary Examiner*—Tariq R. Hafiz
*Assistant Examiner*—Scott L. Jarrett
(74) *Attorney, Agent, or Firm*—Hunton & Williams

(57) ABSTRACT

A system and method for providing project management tools to support construction, renovations, maintenance and other projects. The system automates the creation, processing and approval cycles of the numerous documents involved with each project. The system provides standardized work processes through processing templates. The system provides automated control and management of the process. The system allows project initiation and funding approval by clients throughout the corporation via a desktop browser coupled to a corporate Intranet. A software application embodying the present invention and its underlying technology are appropriate for a paper intensive area. It reduces the approval cycle of projects. It automates the creation, processing and approval cycle of documents by routing documents electronically for on-line approval.

21 Claims, 17 Drawing Sheets

U.S. PATENT DOCUMENTS

| | | |
|---|---|---|
| 4,992,940 A | 2/1991 | Dworkin |
| 5,016,270 A | 5/1991 | Katz |
| 5,040,142 A | 8/1991 | Mori et al. ............... 364/900 |
| 5,050,207 A | 9/1991 | Hitchcock |
| 5,084,816 A | 1/1992 | Boese |
| 5,117,355 A | 5/1992 | McCarthy |
| 5,125,075 A * | 6/1992 | Goodale et al. ............ 709/206 |
| 5,157,717 A | 10/1992 | Hitchcock |
| 5,189,606 A * | 2/1993 | Burns et al. ................. 705/10 |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,315,504 A * | 5/1994 | Lemble ...................... 700/90 |
| 5,317,683 A | 5/1994 | Hager et al. |
| 5,321,841 A | 6/1994 | East |
| 5,351,186 A | 9/1994 | Bullock |
| 5,381,332 A * | 1/1995 | Wood .............................. 705/8 |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,485,370 A | 1/1996 | Moss et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Green et al. |
| 5,603,025 A | 2/1997 | Tabb |
| 5,604,490 A | 2/1997 | Blakely et al. |
| 5,606,496 A | 2/1997 | D'Agostino |
| 5,611,052 A * | 3/1997 | Dykstra et al. ............... 705/38 |
| 5,617,428 A * | 4/1997 | Andoh ...................... 714/726 |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,659,616 A * | 8/1997 | Sudia ........................ 705/76 |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,706,452 A * | 1/1998 | Ivanov ....................... 715/751 |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Pinard et al. |
| 5,761,647 A | 6/1998 | Boushy |
| 5,761,661 A | 6/1998 | Coussenns |
| 5,764,789 A | 6/1998 | Pare et al. |
| 5,765,140 A * | 6/1998 | Knudson et al. ................ 705/9 |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,460 A | 11/1998 | Bednar |

| | | | | | | |
|---|---|---|---|---|---|---|
| 5,832,476 A | 11/1998 | Tada | | 5,960,411 A | 9/1999 | Hartman et al. |
| 5,835,087 A | 11/1998 | Herz | | 5,961,593 A | 10/1999 | Gabber et al. |
| 5,835,580 A | 11/1998 | Fraser | | 5,963,635 A | 10/1999 | Szlam et al. |
| 5,835,603 A | 11/1998 | Coutts | | 5,963,925 A | 10/1999 | Kolling et al. |
| 5,838,906 A | 11/1998 | Doyle | | 5,963,952 A | 10/1999 | Smith |
| 5,842,178 A | 11/1998 | Giovannoli | | 5,963,953 A | 10/1999 | Cram et al. |
| 5,842,211 A | 11/1998 | Horadan | | 5,966,695 A | 10/1999 | Melchione et al. |
| 5,844,553 A | 12/1998 | Hao | | 5,966,699 A | 10/1999 | Zandi |
| 5,845,259 A | 12/1998 | West et al. | | 5,967,896 A | 10/1999 | Jorasch et al. |
| 5,845,260 A | 12/1998 | Nakano et al. | | 5,969,318 A | 10/1999 | Mackenthun |
| 5,847,709 A | 12/1998 | Card | | 5,970,143 A | 10/1999 | Schneier et al. |
| 5,848,143 A | 12/1998 | Andrews | | 5,970,470 A | 10/1999 | Walker et al. |
| 5,848,271 A | 12/1998 | Caruso et al. ............... 395/680 | | 5,970,478 A | 10/1999 | Walker et al. |
| 5,848,400 A | 12/1998 | Chang | | 5,970,482 A | 10/1999 | Pham |
| 5,848,427 A | 12/1998 | Hyodo | | 5,970,483 A | 10/1999 | Evans |
| 5,852,812 A | 12/1998 | Reeder | | 5,978,467 A | 11/1999 | Walker et al. |
| 5,857,079 A | 1/1999 | Claus et al. | | 5,983,196 A | 11/1999 | Wendkos |
| 5,862,223 A | 1/1999 | Walker | | 5,987,434 A | 11/1999 | Libman |
| 5,864,830 A | 1/1999 | Armetta et al. | | 5,987,498 A | 11/1999 | Athing et al. |
| RE36,116 E | 2/1999 | McCarthy | | 5,991,736 A | 11/1999 | Ferguson et al. |
| 5,870,718 A | 2/1999 | Spector | | 5,991,738 A | 11/1999 | Ogram |
| 5,870,721 A * | 2/1999 | Norris ......................... 705/38 | | 5,991,748 A | 11/1999 | Taskett |
| 5,870,724 A | 2/1999 | Lawlor | | 5,991,751 A | 11/1999 | Rivette et al. |
| 5,870,725 A | 2/1999 | Bellinger et al. | | 5,991,780 A | 11/1999 | Rivette |
| 5,871,398 A | 2/1999 | Schneier et al. | | 5,995,948 A | 11/1999 | Whitford |
| 5,873,072 A | 2/1999 | Kight | | 5,995,976 A | 11/1999 | Walker et al. |
| 5,873,096 A | 2/1999 | Lim | | 5,999,596 A | 12/1999 | Walker et al. |
| 5,880,769 A | 3/1999 | Nemirofsky | | 5,999,907 A | 12/1999 | Donner |
| 5,883,810 A | 3/1999 | Franklin et al. | | 6,000,033 A | 12/1999 | Kelly et al. |
| 5,884,032 A | 3/1999 | Bateman | | 6,001,016 A | 12/1999 | Walker et al. |
| 5,884,270 A | 3/1999 | Walker et al. | | 6,003,762 A | 12/1999 | Hayashida |
| 5,884,272 A | 3/1999 | Walker et al. | | 6,005,939 A | 12/1999 | Fortenberry et al. |
| 5,884,274 A | 3/1999 | Walker et al. | | 6,006,205 A | 12/1999 | Loeb et al. |
| 5,884,288 A | 3/1999 | Chang | | 6,006,249 A | 12/1999 | Leong |
| 5,889,863 A | 3/1999 | Weber | | 6,009,415 A | 12/1999 | Shurling et al. |
| 5,892,900 A | 4/1999 | Ginter et al. | | 6,009,442 A | 12/1999 | Chen et al. |
| 5,898,780 A | 4/1999 | Liu et al. | | 6,010,404 A | 1/2000 | Walker et al. |
| 5,899,982 A | 5/1999 | Randle | | 6,012,088 A | 1/2000 | Li et al. |
| 5,903,881 A | 5/1999 | Schrader | | 6,012,983 A | 1/2000 | Walker et al. |
| 5,909,486 A | 6/1999 | Walker et al. | | 6,014,439 A | 1/2000 | Walker et al. |
| 5,910,988 A | 6/1999 | Ballard | | 6,014,635 A | 1/2000 | Harris et al. |
| 5,913,202 A | 6/1999 | Motoyama | | 6,014,636 A | 1/2000 | Reeder |
| 5,914,472 A | 6/1999 | Foladare et al. | | 6,014,638 A | 1/2000 | Burge et al. |
| 5,915,244 A | 6/1999 | Jack et al. | | 6,014,641 A | 1/2000 | Loeb et al. |
| 5,918,214 A | 6/1999 | Perkowski | | 6,014,645 A | 1/2000 | Cunningham |
| 5,918,217 A | 6/1999 | Maggioncalda | | 6,016,810 A | 1/2000 | Ravenscroft |
| 5,918,239 A | 6/1999 | Allen et al. | | 6,018,714 A | 1/2000 | Risen, Jr. |
| 5,920,847 A | 7/1999 | Kolling et al. | | 6,018,718 A | 1/2000 | Walker et al. |
| 5,921,864 A | 7/1999 | Walker et al. | | 6,024,640 A | 2/2000 | Walker et al. |
| 5,923,763 A | 7/1999 | Walker et al. | | 6,026,429 A | 2/2000 | Jones et al. |
| 5,926,796 A | 7/1999 | Walker et al. | | 6,032,132 A * | 2/2000 | Nelson ......................... 705/34 |
| 5,926,812 A | 7/1999 | Hilsenrath | | 6,032,134 A | 2/2000 | Weissman |
| 5,930,764 A | 7/1999 | Melchione | | 6,032,147 A | 2/2000 | Williams et al. |
| 5,933,816 A | 8/1999 | Zeanah | | 6,038,547 A * | 3/2000 | Casto ......................... 705/30 |
| 5,933,817 A | 8/1999 | Hucal | | 6,038,552 A | 3/2000 | Fleischl et al. |
| 5,933,823 A | 8/1999 | Cullen | | 6,042,006 A | 3/2000 | Van Tilburg et al. |
| 5,933,827 A | 8/1999 | Cole | | 6,044,362 A | 3/2000 | Neely |
| 5,940,812 A | 8/1999 | Tengel et al. | | 6,045,039 A | 4/2000 | Stinson et al. |
| 5,943,656 A | 8/1999 | Crooks | | 6,049,778 A | 4/2000 | Walker et al. |
| 5,944,824 A | 8/1999 | He | | 6,049,782 A | 4/2000 | Gottesman et al. |
| 5,945,653 A | 8/1999 | Walker et al. | | 6,049,835 A | 4/2000 | Gagnon |
| 5,946,388 A | 8/1999 | Walker et al. | | 6,055,637 A | 4/2000 | Hudson et al. |
| 5,947,747 A | 9/1999 | Walker et al. | | 6,061,665 A | 5/2000 | Bahreman |
| 5,949,044 A | 9/1999 | Walker et al. | | 6,064,987 A | 5/2000 | Walker et al. |
| 5,949,875 A | 9/1999 | Walker et al. | | 6,065,675 A | 5/2000 | Teicher |
| 5,950,173 A | 9/1999 | Perkowski | | 6,067,531 A * | 5/2000 | Hoyt et al. .................... 705/35 |
| 5,950,174 A | 9/1999 | Brendzel | | 6,070,147 A | 5/2000 | Harms et al. |
| 5,950,206 A * | 9/1999 | Krause ................... 707/104.1 | | 6,070,153 A | 5/2000 | Simpson |
| 5,952,639 A | 9/1999 | Ohki | | 6,070,244 A | 5/2000 | Orchier et al. |
| 5,952,641 A | 9/1999 | Korshun | | 6,073,105 A | 6/2000 | Sutcliffe et al. |
| 5,953,710 A | 9/1999 | Fleming | | 6,073,113 A | 6/2000 | Guinan |
| 5,956,695 A | 9/1999 | Carrithers et al. | | 6,075,519 A | 6/2000 | Okatani et al. |
| 5,958,007 A | 9/1999 | Lee et al. | | 6,076,072 A | 6/2000 | Libman |

| Patent No. | Date | Name | | Patent No. | Date | Name |
|---|---|---|---|---|---|---|
| 6,081,790 A | 6/2000 | Rosen | | 6,289,322 B1 | 9/2001 | Kitchen et al. |
| 6,081,810 A | 6/2000 | Rosenzweig et al. | | 6,298,330 B1 | 10/2001 | Gardenswartz et al. |
| 6,085,168 A | 7/2000 | Mori et al. | | 6,298,356 B1 | 10/2001 | Jawahar et al. |
| 6,088,444 A | 7/2000 | Walker et al. | | 6,301,567 B1 | 10/2001 | Leong et al. |
| 6,088,451 A | 7/2000 | He et al. | | 6,308,273 B1 | 10/2001 | Goertzel et al. |
| 6,088,683 A | 7/2000 | Jalili | | 6,308,274 B1 | 10/2001 | Swift |
| 6,088,686 A | 7/2000 | Walker et al. | | 6,311,275 B1 | 10/2001 | Jin et al. |
| 6,088,700 A | 7/2000 | Larsen et al. | | 6,317,838 B1 | 11/2001 | Baize |
| 6,091,817 A | 7/2000 | Bertina et al. | | 6,324,524 B1 | 11/2001 | Lent et al. |
| 6,092,050 A * | 7/2000 | Lungren et al. .......... 705/36 R | | 6,327,573 B1 | 12/2001 | Walker et al. |
| 6,092,196 A | 7/2000 | Reiche | | 6,327,578 B1 | 12/2001 | Linehan |
| 6,095,412 A | 8/2000 | Bertina et al. | | 6,332,192 B1 | 12/2001 | Boroditisky et al. |
| 6,098,070 A | 8/2000 | Maxwell | | 6,336,104 B1 | 1/2002 | Walker et al. |
| 6,101,486 A | 8/2000 | Roberts et al. | | 6,343,279 B1 | 1/2002 | Bissonette et al. |
| 6,104,716 A | 8/2000 | Crichton et al. | | 6,345,261 B1 | 2/2002 | Feidelson |
| 6,105,012 A | 8/2000 | Chang et al. | | 6,349,242 B2 | 2/2002 | Mahaffey |
| 6,105,865 A | 8/2000 | Hardesty | | 6,349,336 B1 | 2/2002 | Sit et al. |
| 6,111,858 A | 8/2000 | Greaves et al. | | 6,385,594 B1 * | 5/2002 | Lebda et al. .................. 705/38 |
| 6,112,181 A | 8/2000 | Shear et al. | | 6,401,211 B1 | 6/2002 | Brezak, Jr. et al. |
| 6,115,690 A | 9/2000 | Wong | | 6,408,389 B2 | 6/2002 | Grawrock et al. |
| 6,119,093 A | 9/2000 | Walker et al. | | 6,418,457 B1 | 7/2002 | Schmidt et al. |
| 6,119,099 A | 9/2000 | Walker et al. | | 6,438,594 B1 | 8/2002 | Bowman-Amuah |
| 6,128,599 A | 10/2000 | Walker et al. | | 6,442,567 B1 * | 8/2002 | Retallick et al. ......... 707/104.1 |
| 6,128,602 A | 10/2000 | Northington et al. | | 6,453,353 B1 | 9/2002 | Win et al. |
| 6,131,810 A | 10/2000 | Weiss et al. | | 6,460,141 B1 | 10/2002 | Olden |
| 6,134,549 A | 10/2000 | Regnier et al. | | 6,493,677 B1 | 12/2002 | von Rosen et al. |
| 6,135,349 A | 10/2000 | Zirkel | | 6,493,685 B1 | 12/2002 | Ensel et al. |
| 6,138,106 A | 10/2000 | Walker et al. | | 6,496,855 B1 | 12/2002 | Hunt et al. |
| 6,138,118 A | 10/2000 | Koppstein et al. | | 6,496,936 B1 | 12/2002 | French et al. |
| 6,141,651 A | 10/2000 | Riley et al. | | 6,505,176 B2 * | 1/2003 | DeFrancesco et al. ........ 705/38 |
| 6,144,946 A | 11/2000 | Iwamura | | 6,510,523 B1 | 1/2003 | Perlman et al. |
| 6,144,948 A | 11/2000 | Walker et al. | | 6,532,284 B2 | 3/2003 | Walker et al. |
| 6,145,086 A | 11/2000 | Bellemore et al. | | 6,535,855 B1 | 3/2003 | Cahill et al. |
| 6,148,293 A | 11/2000 | King | | 6,535,917 B1 | 3/2003 | Zamanzadeh et al. |
| 6,151,584 A | 11/2000 | Papierniak et al. | | 6,535,980 B1 | 3/2003 | Kumar et al. |
| 6,154,750 A | 11/2000 | Roberge et al. | | 6,557,039 B1 | 4/2003 | Leong et al. |
| 6,154,879 A | 11/2000 | Pare et al. | | 6,581,040 B1 * | 6/2003 | Wright et al. .................. 705/8 |
| 6,161,113 A * | 12/2000 | Mora et al. .................. 715/505 | | 6,584,508 B1 | 6/2003 | Epstein et al. |
| 6,161,182 A | 12/2000 | Nadooshan | | 6,609,113 B1 | 8/2003 | O'Leary et al. |
| 6,164,533 A | 12/2000 | Barton | | 6,609,125 B1 | 8/2003 | Layne et al. |
| 6,167,378 A * | 12/2000 | Webber, Jr. .................. 705/8 | | 6,609,198 B1 | 8/2003 | Wood et al. |
| 6,170,011 B1 | 1/2001 | Beck et al. | | 6,618,579 B1 | 9/2003 | Smith et al. |
| 6,178,511 B1 | 1/2001 | Cohen et al. | | 6,618,806 B1 | 9/2003 | Brown et al. |
| 6,182,052 B1 | 1/2001 | Fulton et al. | | 6,623,415 B2 | 9/2003 | Gates et al. |
| 6,182,142 B1 | 1/2001 | Win et al. | | 6,687,222 B1 | 2/2004 | Albert et al. |
| 6,182,225 B1 | 1/2001 | Hagiuda et al. | | 6,772,146 B2 | 8/2004 | Khemlani et al. |
| 6,185,242 B1 | 2/2001 | Arthur et al. | | 6,820,202 B1 | 11/2004 | Wheeler et al. |
| 6,189,029 B1 | 2/2001 | Fuerst | | 6,832,202 B1 * | 12/2004 | Schuyler et al. ................ 705/8 |
| 6,195,644 B1 | 2/2001 | Bowie | | 6,882,986 B1 * | 4/2005 | Heinemann et al. .......... 705/40 |
| 6,199,077 B1 | 3/2001 | Inala et al. | | 7,089,203 B1 * | 8/2006 | Crookshanks ................ 705/37 |
| 6,201,948 B1 | 3/2001 | Cook et al. | | 2001/0012974 A1 | 8/2001 | Mahaffey |
| 6,202,005 B1 | 3/2001 | Mahaffey | | 2001/0032184 A1 | 10/2001 | Tenembaum |
| 6,202,054 B1 | 3/2001 | Lawlor et al. | | 2001/0047295 A1 | 11/2001 | Tenembaum |
| 6,202,151 B1 | 3/2001 | Musgrave et al. | | 2001/0051917 A1 | 12/2001 | Bissonette et al. |
| 6,208,978 B1 | 3/2001 | Walker et al. | | 2001/0054003 A1 | 12/2001 | Chien et al. |
| 6,208,984 B1 | 3/2001 | Rosenthal | | 2002/0007313 A1 | 1/2002 | Mai et al. |
| 6,216,115 B1 | 4/2001 | Barrameda et al. | | 2002/0007460 A1 | 1/2002 | Azuma |
| 6,219,706 B1 | 4/2001 | Fan | | 2002/0010599 A1 | 1/2002 | Levison |
| 6,222,914 B1 | 4/2001 | McMullin | | 2002/0010668 A1 | 1/2002 | Travis et al. |
| 6,226,623 B1 | 5/2001 | Schein et al. | | 2002/0018585 A1 | 2/2002 | Kim |
| 6,226,679 B1 | 5/2001 | Gupta | | 2002/0019938 A1 | 2/2002 | Aarons |
| 6,227,447 B1 | 5/2001 | Campisano | | 2002/0059141 A1 | 5/2002 | Davies et al. |
| 6,230,148 B1 | 5/2001 | Pare et al. | | 2002/0077978 A1 | 6/2002 | O'Leary et al. |
| 6,243,688 B1 | 6/2001 | Kalina | | 2002/0099826 A1 | 7/2002 | Summers et al. |
| 6,243,816 B1 | 6/2001 | Fang et al. | | 2002/0104006 A1 | 8/2002 | Boate et al. |
| 6,253,327 B1 | 6/2001 | Zhang et al. | | 2002/0104017 A1 | 8/2002 | Stefan |
| 6,253,328 B1 | 6/2001 | Smith, Jr. | | 2002/0107788 A1 | 8/2002 | Cunningham |
| 6,260,026 B1 | 7/2001 | Tomida et al. | | 2002/0165949 A1 | 11/2002 | Na |
| 6,266,648 B1 | 7/2001 | Baker, III | | 2002/0184507 A1 | 12/2002 | Makower et al. |
| 6,266,683 B1 | 7/2001 | Yehuda et al. | | 2002/0188869 A1 | 12/2002 | Patrick |
| 6,267,292 B1 | 7/2001 | Walker et al. | | 2002/0191548 A1 | 12/2002 | Ylonen et al. |
| 6,269,348 B1 | 7/2001 | Pare et al. | | 2003/0018915 A1 | 1/2003 | Stoll |
| 6,275,944 B1 | 8/2001 | Kao et al. | | 2003/0023880 A1 | 1/2003 | Edward et al. |

| | | | |
|---|---|---|---|
| 2003/0037142 | A1 | 2/2003 | Munger et al. |
| 2003/0046587 | A1 | 3/2003 | Bheemarasetti et al. |
| 2003/0046589 | A1 | 3/2003 | Gregg |
| 2003/0051026 | A1 | 3/2003 | Carter et al. |
| 2003/0070069 | A1 | 4/2003 | Belapurkar et al. |
| 2003/0070084 | A1 | 4/2003 | Satomaa et al. |
| 2003/0074580 | A1 | 4/2003 | Knouse et al. |
| 2003/0079147 | A1 | 4/2003 | Hsleh et al. |
| 2003/0084345 | A1 | 5/2003 | Bjornestad et al. |
| 2003/0084647 | A1 | 5/2003 | Smith et al. |
| 2003/0088552 | A1 | 5/2003 | Bennett et al. |
| 2003/0105981 | A1 | 6/2003 | Miller et al. |
| 2003/0110399 | A1 | 6/2003 | Rail |
| 2003/0115160 | A1 | 6/2003 | Nowlin et al. |
| 2003/0119642 | A1 | 6/2003 | Gastes et al. |
| 2003/0154403 | A1 | 8/2003 | Keinsley et al. |
| 2003/0159072 | A1 | 8/2003 | Bellinger et al. |
| 2003/0163733 | A1 | 8/2003 | Barriga-Caceres et al. |
| 2003/0177067 | A1 | 9/2003 | Cowell et al. |
| 2003/0191549 | A1 | 10/2003 | Otsuka et al. |

FOREIGN PATENT DOCUMENTS

| | | |
|---|---|---|
| DE | 19731293 | 1/1999 |
| EP | 0387462 | 9/1990 |
| EP | 0823687 | 2/1998 |
| EP | 0884877 | 12/1998 |
| EP | 0917119 | 5/1999 |
| WO | WO 97/43736 | 11/1997 |
| WO | WO 99/52051 | 10/1999 |
| WO | WO 00/68858 | 11/2000 |
| WO | WO 01/35355 | 5/2001 |
| WO | WO 01/43084 | 6/2001 |

OTHER PUBLICATIONS www.project-manager.com—Project management web site archived on Jan. 27, 1999.*
Brock, Horace & Palmer, Charles, "Accounting Principles and Applications", McGraw-Hill, 1981.*
Marchman, David A., Construction Scheduling with Primavera: Project Planner Delmar Publishers, Aug. 14, 1997, ISBN: 0827370865, Table of Contents.*
Ritz, George, Total Construction Project Management McGraw-Hill Professional, Dec. 1, 1993, ISBN: 0070529868, Table of Contents.*
Harris, Paul E., Planning Using Primavera Project Planner P3 Ver 3.0 Eastwood Harris, Jun. 1, 1999, ISBN: 0957778317, Table of Contents.*
Civitello, Andrew M., Construction Operations Manual of Policies and Procedures, 3rd Edition McGraw-Hill, Jul. 11, 2000, ISBN: 0071354956, Table of Contents.*
Primavera.com web pages Apr. 1999, Retrieved from Archive.org Jun 23, 2005.*
Bechtel Construction Operations Incorporated Standardizes on Primavera's Expedition Contract Management Software Jul. 27, 1999, Business Wire.*
Primavera and PurchasePro.com to Create E-Commerce Marketplace for Construction Industry Primavera Systems, Inc., Press Release, Sep. 21, 1999.*
Primavera Expedition—Contract Control Software—User's Guide Version 6.0 Primavera Systems, Inc., 1998.*
IBM's MQSeries Workflow Automates Business Processes to Help Companies Compete in E-Business Business Wire, Jul. 28, 1998.*
IBM's MQSeries Workflow Automates Business Processes to Help Companies Compete in E-Business IBM Press Releases, Jul. 28, 1998.*
What's happening to workflow? Infoworld, Apr. 5, 1999, vol. 21, No. 14.*
Radosevich, Lynda, Is workflow working? Cnn.com, Apr. 6, 1999.*
Marlin, Steven, Chasing Document Management Inform, Apr. 1999, Vol. 13, No. 4.*
Nowlin, Jerry, Construction Financing to Build Your Own Home Jul. 1990, ISBN: 0962864307.*

OMWARE, Inc. Web Pages Feb. 2000, Retrieved from Archive.org Nov. 28, 2005.*
Mosig, Richard, Software review: The construction project manager Cost Engineering, Jan. 1996, vol. 38, No. 1, pp. 7-8.*
Deckmyn, Dominique, San Francisco manages $45m project via web-based service Computerworld, Aug. 9, 1999, vol. 33, No. 32, p 14.*
Larsen, Amy, Internet Goes to Work for Builders InternetWeek, Nov. 16, 1998, Issue 741.*
Fusaro, Roberta, Builders moving to Web Tools Computerworld, Nov. 16, 1998, vol. 32, No. 46, pp. 51, 53.*
Primavera Systems Delivers Expedition Express Business Wire, Feb. 23, 1999.*
Hernandez, Tomas et al., Software solutions Building Design & Construction, Nov. 1999, vol. 40, No. 11, pp. 38-40.*
Owen, David, Facilities Planning & Relocation RSMeans, 1993, ISBN: 0-87629-281-3.*
Seibert, Paul, Facilities Planning & Design for Financial Institutions Bankline Publications, 1996, ISBN: 1-55738-780-X.*
Cotts, David, The Facility Management Handbook—Second Edition AMACOM, 1998, ISBN: 0-8144-030-8.*
Oracle Projects User's Guide—Release 11, vol. 1 Oracle, 1998, Part No. A58474-01.*
PCT Written Opinion mailed Apr. 17, 2003.
Kutler, A Different Drummer on the Data Highway, American Banker, Section: No. 91, vol. 160, p. 14, May 12, 1995.
Epper, A Player Goes After Big Bucks in Cyberspace, American Banker, vol. 160, No. 86, ISSN: 0002-7561, p. 17, May 5, 1995.
Berry et al., A potent new tool for selling databse, Business Week, Cover Story, pp. 56-62, Sep. 5, 1994.
Applets, java.sun.com, May 21, 1999.
UNKNOWN, Associates National Bank (DE) Credit Card, The Associates, www.theassociates.com/consumer/credit_cards/main.html, 6 pages, Apr. 6, 1999.
Your Request, www.wingspanbank.com, Sep. 28, 1999.
ANONYMOUS, Aversion Therapy: Banks Overcoming Fear of the 'Net to Develop Safe Internet-based Payment System w/ Netscape Communicator, Network World, ISSN: 0887-7661, Dec. 12, 1994.
JAVA, Banking on JAVA(TM) Technology, java.sun.com, May 21, 1999.
Bechtel Construction Operations Incorporated Standardizes on Primavera's Expedition Contract Management Software, Business Wire, Jul. 27, 1999.
ANONYMOUS, Corba Overview, arch2.htm at pent21.infosys.tuwien.ac.at, May 25, 1999.
Vandenengel, Cards on the Internet: Advertising on a $3 Bill, Industry Intelligence, pp. 46-48, Feb. 1, 1995.
Kutler, Cash Card Creator Looking Beyond Mondex, Feb. 9, 1995.
BANK, Cash, Check,Charge—What's Next?, Seattle Times, Mar. 6, 1995.
Consortium Created to Manage Common Electronic Purse Specifications, http://www.visa.com/av/news/PRmisc051199.vhtml, printed Feb. 23, 2001.
Civitello Jr., Construction Operations Manual of Policies and Procedures, Third Edition, 2000.
Chester, Cross-platform integration with XML and SOAP, IT PTO Sep.-Oct. 2001.
Mitchell, Cyberspace: Crafting Software . . . , Business Week, Feb. 27, 1999, pp. 78-86, Feb. 27, 1995.
Friedman, Dictionary of Business Terms, Barron's Third Edition, Copyright 2000, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise JAVABEANS(TM) Technology: Server Component Model for the Java(TM) platform, java.sun.com, May 2, 1999, May 21, 1999.
Maize, Fannie Mae on the Web, Doucment ID: 52079, May 8, 1995, abstract only.
FreeMarkets, printed on Apr. 26, 1999.

The Gale Group, G&D America's Multi-application Smart Card Selected for Combined Payroll and 'Virtual Banking' Program in Mexico, Business Wire, Apr. 24, 1998, p241047.
The Gale Group, G&D America's Multi-application Smart Card Selected for Combined Payroll and 'Virtual Banking' Program in Mexico, Business Wire, Apr. 24, 1998, p241047.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
JAVA, JAVA (TM) Technology in the Real World, java.sun.com, May 21, 1999.
JAVA, JAVA(TM) Remote Method Invocation (RMI) Interface, java.sun.com, 05/32/1999, May 21, 1999.
JAVA, JAVA(TM) Servlet API, java.sun.com, May 21, 1999.
OMG, Library, www.omg.com, May 25, 1999.
Method of Protecting Data on A Personal Computer, IBM Corporation, TDB 11-85, Order 85A 62426, Nov. 1, 1995, p. 2530, Nov. 1, 1985, abstract only.
Clark, Microsoft, Visa to Jointly Develop PC Electronic-Shopping Software, The Wall Street Journal, Nov. 9, 1994, WSJ B9.
Sirbu, et al, NetBill: An Internet Commerce System Optimized for Network Delivered Services, printed on Feb. 27, 1995.
Mitchell, Netlink Goes After An Unbanked Niche, Card Technology, ISSN: 1093-1279, p. 22, Sep. 1999.
Houlder, OFT Gives the Individual Top Priority: Report Calls for Deregulation of Business Lending, Document ID: 91716, Jun. 8, 1994, abstract only.
ANONYMOUS, Overview of CORBA, May 25, 1999.
Harris, Planning Using Primavera Project Planner P3 Version 3.0, User Guide, Copyright 1999 by Eastwood Harry Pty Ltd., 1999.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Pasword Exposure No Decryption and Technology Adaptivity, IBM Corporation, TDB 03-95, Order 95A, Mar. 1, 1995, pp. 245-248, abstract only.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
SIEBEL, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers By Engineers, Thomas Publishing Company, Apr. 26, 1999.
JAVA, Staying in touch with JNDI, java.sun.com, May 21, 1999.
Summary of The At Your Request Architecture, First USA Bank Confidential and Proprietary, Apr. 2, 1999; pp. 1-8.
JAVA, The JDBC(TM) Data Access API, java.sun.com, May 21, 1999.
The check is in the email, Information Today, vol. 12, No. 3, ISSN: 8755-6286, 03/01995, Mar. 1, 1995.
Thomas Publishing Company, ThomasNet, 04/26, 1999, Apr. 26, 1999.
RITZ, Total Construction Project Management, McGraw-Hill, 1994.
Hewlett-Packard Company, Understanding Product Data Management, Hewlett-Packard Company, Apr. 26, 1999.
Hewlett-Packard Company, Understanding Product Data Management, Hewlett-Packard Company, Apr. 26, 1999Welcome to MUSE.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
eCharge, eCharge Corporation, www.echarge.com, Dec. 3, 1999.
Sun Microsystems, Inc., "Getting Started Using RMI," Copyright 1996, 1997, 1998, 1999, pp. 1-14 (May 21, 1999).
"Getting Started," GTN Post General Info, (Apr. 26, 1999).
"Resource Center," GE TPN Glossary of Terms, (Apr. 26, 1999).
Marchman, Construction Scheduling with Primavera Project Planner, May 25, 1999.

* cited by examiner

FIG. 8

Purchase Order Request for Project # 83 CENTRALIZED LAN SERVER CITY as of 9/4/98

Project Profile (455)
- Project Number: 83
- Project Name: Centralized LAN Server City
- Project Location: 52 BROADWAY / Floor: 2
- Date Prepared: 9/3/98 16:44:14
- Project Manager: Albert P. Rond
- Cost Center: 1757

Commitment Information (480)
- Trade: 40000
- Protocol: NEGOTIATED
- Commitment Type: PO
- Certificate of Capital Improvement: T

Vendor Information (485)
- Vendor: Empire Office Equipment
- Vendor Number: 35
- Description:
- Trade Code: 40101
- G.L. Account: 0

Cost (490)
- Material/Services: $15,274.00
- Freight/Delivery: $500.00
- Subtotal: $15,774.00
- Sales Tax: 8.25 %  $1,301.38
- Total Cost: $17,075.38

Financial Commitments (470)
- Approved Funding: $281,100.00
- Previous Commitments: $0.00
- This Commitment: $17,075.38
- Total Commitments: $17,075.38

Business Function, Name, Date | Name, Title, Location | Phone Number

FIG. 13A  Facilities Management
Capital Project Funding

Project Number: 201499

 Chase

Project Information

Project Name: ACQ FINANCE
Business Unit: Global
Building/Floor: 270 PARK AVENUE/4
Cost Center(s): 03791

Project Manager: David L Beale

Date Prepared: Dec 9, 1999
Start Date: Dec 1, 1999
Est. Completion Date: Feb 15, 2000

Project Description/Justification

This funding document is submitted to convert a 15 x 20 conference room into an open work area containing files and four new cubicles. The cubicles will accomodate revenue producing staff for Acquisition Finance within the group's existing floor area. Since no existing cubicles are available, these would be purchased new. The 15,000 capital furniture cost is for these new cubicles. Existing seating will be reused. The construction cost of $14,000 is for electrical outlet installation, removal of the existing conference room door and partition, and painting all on overtime. The moving cost of $4,000 includes moving millwork trim and glass panels to the warehouse. The expense furniture cost of $4,000 includes carpet patching and chair refurbishing.

Remarks: FUNDING DOCUMENT-ACQ FINANCE

Budget

| Trade Categories | Original | Supplemental | Total |
|---|---|---|---|
| CAPITAL ITEMS: | | | |
| Consultants Fees | $3,000.00 | | $3,000.00 |
| Construction Trades | $14,000.00 | | $14,000.00 |
| Carpet | | | |
| Furniture/Furnishings | $15,000.00 | | $15,000.00 |
| Equipment | | | |
| Other (Specify) | | | |
| Sub-total | $32,000.00 | | $32,000.00 |
| Contingency Fee (Not to Exceed 10% of Sub-total) | $2,800.00 | | $2,800.00 |
| Sub-total Capital | $34,800.00 | | $34,800.00 |
| TOTAL CAPITAL ESTIMATE | $34,800.00 | | $34,800.00 |

EXPENSE ITEMS:
- Move/Relocation Costs     $4,000.00
- Cleaning
- Furniture/Furnishings     $4,000.00
- Miscellaneous     $1,000.00

TOTAL EXPENSE ESTIMATE     $9,000.00
Sub-Total CAPITAL and EXPENSE     $43,800.00
Funding Cost     $440.48
CREDITS

TOTAL PROJECT ESTIMATE     $44,240.48

{ 705

*NOTE: Project Totals do not include telecommunication funding.*

Approvals

Facility Department
- Project Manager     David     Date: 12/9/1999 10:47 am
- Team Leader     Henry     Date: 12/9/1999 11:42 am
- Design & Construction Manager     Alison     Date: 12/10/1999 4:14 pm

} 710

Business Unit
- Client Coordinator     Mary     Date: 12/15/1999 10:05 am
- Business Unit Manager     Proxy for Business Unit Manager,     Date: 1/18/2000 9:27 am
- Business Unit Controller     Proxy for Business Unit Controller,     Date: 1/18/2000 9:28 am

} 715

REBS
- Control Unit     Elzer     Date: 1/18/2000 2:17 am

SYSTEM AND METHOD FOR PROVIDING FUNDING APPROVAL ASSOCIATED WITH A PROJECT BASED ON A DOCUMENT COLLECTION

FIELD OF THE INVENTION

The present invention is related to and claims priority to U.S. Provisional Patent Application No. 60/163,506 entitled AUTOMATED FINANCIAL PROJECT MANAGEMENT SYSTEM, filed Nov. 4, 1999, the contents of which are incorporated herein by reference.

BACKGROUND OF THE INVENTION

Project management, especially in the area of corporate real estate project management, is traditionally a process which is driven by paper forms and documents. These paper documents include for example, purchase orders, work orders, contracts, Requests for Assistance (RFA), Requests for Proposals (RFPs), commitments, bids, invoices, messages (generic correspondence), meeting announcements and minutes, project close outs, complete punch lists, project evaluations, and departmental statistics.

The processing of all of these various documents is very labor intensive, error prone and subjects the proposed projects to needless delays. For example, if the manager in charge of approving commitments is on a business trip for two weeks, a commitment requiring his or her signature might be delayed for an additional six weeks, which in turn delays another vendor's initiation of work and so on.

Furthermore, an increase in the number of requests for new construction or engineering projects increases the volume of documents that are processed by the project administration group and the accounting operations group. This in turn requires an increase in processing capacity through an increase in staff levels or overtime. Conversely, a decrease in volume of requests lowers the productivity of the groups, as the staff levels are maintained to support the processing at the peak operations volume.

SUMMARY OF THE INVENTION

The present invention was originally designed to automate the project management process for the Corporate Real Estate and Facilities Department of the assignee of the present invention. Although originally designed for this type of real estate and facilities department, it is readily seen that the project management method and system of the present invention has wide applicability to most types of project management.

The system is a collection of process and business objects that provide project management tools to support construction, renovations, maintenance and other projects. One primary function of the system is to automate the creation, processing and approval cycles of the numerous documents involved with each project. The system and method of the present invention provides automation to support the following business processes.

Strategic Space Planning. This function is responsible for determining how much space is required, demographic and market analysis of locations, and owned versus leased funding strategies.

Client Management. The system allows project initiation and funding approval by clients throughout the corporation via a desktop browser coupled to the system via a corporate intranet. This concept facilitates self-service delivery. The request component allows clients to specify requirements for construction, renovation, relocation or office furniture.

Project Support. The system assists the real estate department staff in creating budgets and controlling how budgets are dispensed though purchase orders, work orders and contracts. This includes the table maintenance involved in vendor authorization, workload, reassignment of tasks, security access and security registration, and changes to processes. Project support is provided for the administrative processes such as administering roles and responsibilities, which includes signing authority.

Project Management. The business objects of the system of the present invention assist a project manager in creating a project budget and controlling how that budget is dispensed through purchase orders, work orders and contracts. Invoices are processed against the commitments and are paid through an electronic accounts payable interface. The underlying system structure provides standardized work processes through processing templates. The system provides automated control and management of the process. This methodology is expandable because it is template based, thereby providing an environment for financial based project management. Additionally, Project Management includes phases of project initiation, predesign, schematic design, design development, construction documents, procurement, preconstruction, construction, and post construction. The system includes project management functionality to assist in: Tracking Project Milestones; Corporate Cost Center Allocations for identifying how project expenses should be charged; Messages which are generic correspondence; Meeting Announcements and Minutes; Creation and approval of commitments; Approval of invoices; Project Close Outs; Complete Punch Lists; Project Evaluations; and Departmental Statistics.

Vendor Management. The system allows direct access via the Internet to provide extensive functionality for managing approved vendors in relationship to specific projects. This functionality allows an approved vendor to author Bids, Requests for Quotes (RFQs), Invoices, Punch Lists, Lien Waivers and Messages. Other documents can be received and processed with more limited functionality. These documents include Request for Proposals, Contracts, Work/Purchase Orders, Change Orders, Payment Confirmations and Meeting notices. In addition, an in-box allows for timely communications of messages and documents.

The present invention automates the creation, processing and approval cycles of numerous documents involved in project management. It allows project initiation and funding approval by clients throughout the corporation via a desktop browser coupled to a corporate Intranet. A software application embodying the present invention and its underlying technology are appropriate for a paper intensive area. It reduces the approval cycle of projects. It automates the creation, processing and approval cycle of documents by routing documents electronically for on-line approval.

Other objects, features, and advantages of the present invention will be apparent to one skilled in the art from the following description of the invention with reference to the accompanying drawing.

BRIEF DESCRIPTION OF THE DRAWING

For the purposes of illustrating the present invention, there is shown in the drawings a form which is presently preferred, it being understood however, that the invention is not limited to the precise form shown by the drawing in which:

FIG. 8 shows a Purchase Order commitment;

FIG. 13 illustrates a funding document generated by the system of the present invention;

FIG. 15 illustrates a close out ledger; and

FIG. 16 depicts a partial closeout.

DESCRIPTION OF THE PREFERRED EMBODIMENT

Figure 1:
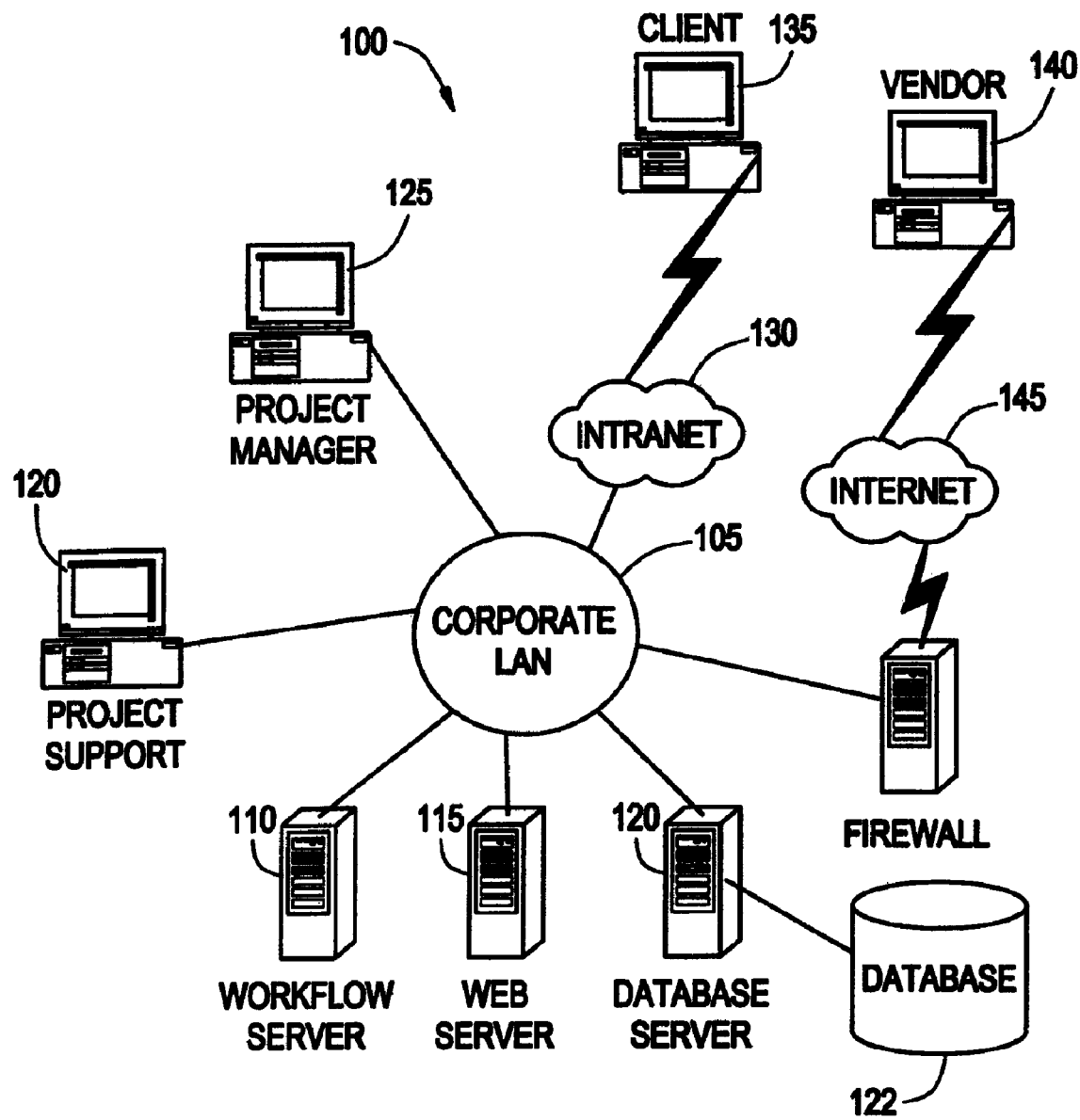
FIG. 1 is an illustration of the structure of the system of the present invention.

FIG. 1 illustrates the system 100 of the present invention. The various parties to the project managed by the system 100 communicate via a corporate Local Area Network (LAN) 105. Connected to the LAN 105 are various servers 110-120 on which reside the applications and databases supporting the system 100. Server 115 contains the applications that enable the clients to initiate and approve project requests and approve funding for such projects. Work flow server 110 contains the applications which enable the project staff to create and route project documents and manage information. In a preferred embodiment, the workplace server 110 is accessed through an icon on the staffs' work stations 120 which operates in a windows environment. The applications can be developed using C, Powerbuilder™, SQL, Cold Fusion™, or other similar software development languages and tools.

Database server 120 provides access to database 122 that contains the various databases housing the details of all of the projects under management. In a preferred embodiment, the databases on server 110 are relational database such as is available from the Oracle™ corporation. Illustrated in FIG. 1 is a work station 125, such as a personal computer (PC), laptop computer or other such workstations for use by project managers. Clients (employees of the corporation initiating projects) access system 100 through a corporate intranet 130 and client work stations 135. Vendors access system 100 using a vendor workstation 140 connect to the corporate LAN 105 preferably through the Internet 145 using a browser. The vendor workstation 140 uses a "thin" client technology meaning that the majority of the software for the vendor access resides on LAN 105 (servers 110, 115). The firewall 150 provides all of the requisite security such as password protection, authentication and encryption (if necessary).

System 100 provides security functions based on roles, signing authority and access rights. Security access is defined through a Role-Business Object-Function relationship. In addition, the ability to perform a function on an object (e.g., a document to be approved) depends on the state of the object. For example, as further described below, if a document has been approved, that document can no longer be modified so as to protect the integrity of the approval. Database 122 contains various tables that support the security function and allow definitions such as: Roles to Person table that identifies all the roles a person can perform; a Functions to Business Object table that identify all the functions and menu items available to a Business Object; a Tree-views to Role table that identifies all the treeviews (described below) available for a role; a Functions to Role table used to classify the functions and menu items as enabled or disabled for each business object within a role; a Function Exceptions table that overrides the classification for functions and menu items for each business object within a role identified at the person level (in other words, include or exclude a specific function in this business object for a person playing this role). A further table contains the state of all of the objects being managed by the system. A history of the revisions to an object (e.g., the changes in state during the approval process of a document) is maintained for auditing purposes. An object in the present invention can have multiple documents associated therewith. For example, if the object is a bid, some of the documents associated with the bid could be a list of vendors (requiring approval) and a commitment (requiring its own separate approval).

Figure 2:
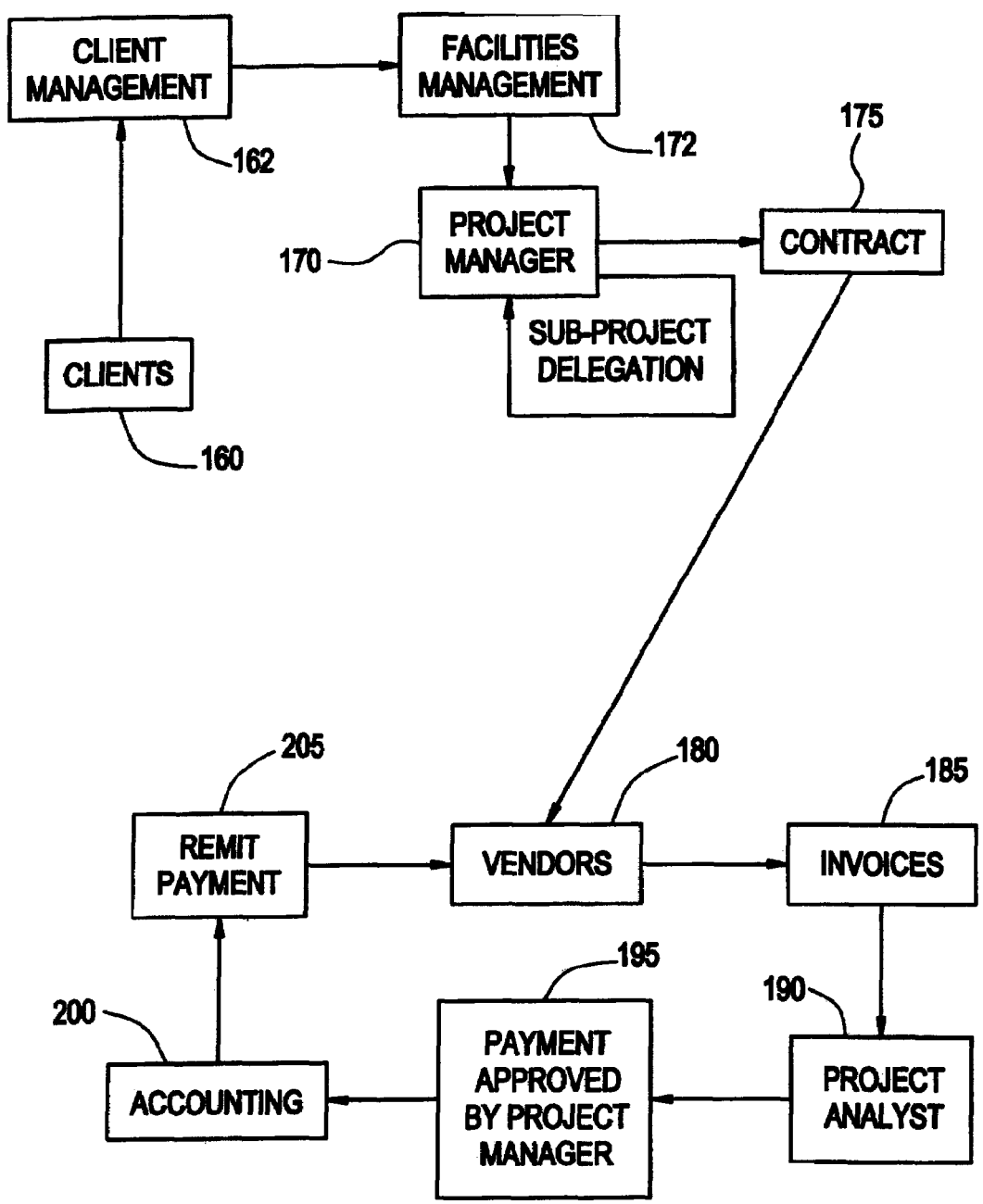
FIG. 2 depicts the process flow of the present invention.

FIG. 2 illustrates a overview of the project process managed by the present invention. The process begins with a client 160 determining that there is a need for the creation of a project. In the preferred embodiment the project is a construction project. The client 160 initiate the project by generating a Request for Assistance (RFA). The Request For Assistance is typically generated by the client 160 with the assistance of a project manager 170. The process of generating an RFA with the aid of a project manager 170 is an iterative one that involves preparation, negotiation, performance and acceptance. The RFA contains the nature and scope of the project, the funding available for and required by the project, and the schedule by which the project must be complete. Although the RFA can be communicated by telephone call or e-mail, in a preferred embodiment of the present invention, the RFA is generated by the client 160 using system 100. Specifically, the client uses its workstation 135 to connect to LAN 105 through the corporate intranet 130 (FIG. 1). The applications on web server 115 prompt the client 160 for all of the necessary information required to complete the RFA 165. The data contained in the RFA 165 is stored in database 122 in separate files associated with the project.

After the client 160 and the and project manager 170 have finalized the RFA, it goes through an approval process (described below) within the client management chain 162. Once the RFA has been approved by client management 162 is it automatically forwarded to facilities management 172 for approval and assignment of a project manager 170. Once the project manager 170 has been assigned and receives the approved RFA, the project manager 170 uses the RFA as a blueprint. As shown in loop 173, the project manager 170 can typically delegate portions of the project to other groups (e.g., design work and its management can be delegated to a design group within the organization). As will be further described below, the project manager 170 creates bid packages, purchase orders and or contracts 175 which are used to solicit the work from vendors 180. Typically project managers 170 work with the various vendors 180 in refining the nature and scope of the project. The project managers 170 receive proposals from the vendors 180 who are bidding on the whole or pieces of the project under consideration. The communication between the project managers 170 and the vendors can occur using the telephone or e-mail, but preferably the vendors 180 communicate with the project managers using their workstations 140 through the Internet 145 and firewall 150.

For larger projects, the result of the bidding and proposal process is a contract 175 which defines, in detail, the tasks to be preformed by the vendors 180 in completing the projects. The specific tasks to be accomplished can be defined via a Purchase Order, a facilities agreement or a service agreement. Typically, contract 175 is a master contract which defines the general nature of the project as well as the general nature of the relationship between the corporation and the vendors 180. Pursuant to the contract 175, the project manager 170 will generate specific commitments to vendors 180 to pay for specific tasks performed by the vendors 180. The contract 175 further provides for the ability of the project managers 170 to issue change orders to the vendors 180 as the scope of the project changes during the evolution of the project.

Upon completion of a task, the vendors 180 issue an invoice 185 to the corporation. The invoice 185 can be transmitted to the corporation via tradition paper method, but preferably is transmitted in an electronic form compatible with system 100. If received in paper form, an invoice 185 is scanned so that it is rendered in electronic form which can be incorporated into system 100 in database 122. The invoice 185 is reviewed by a project analyst 190 for comparison with the contract and the commitment to the vendor 180. The invoice 185 then goes through an approval process by the project manager 195 according to the business rules for the project as further described below. Once approved, the payment on the invoice goes through an accounting process 200 in which the payment is validated and charged against the appropriate portions of the contract. The payment is then remitted 205 to the vendor either through a credit to the vendor's Demand Deposit Account (DDA), via check or via Electronic Data Interchange (EDI) remittance.

Figure 3:
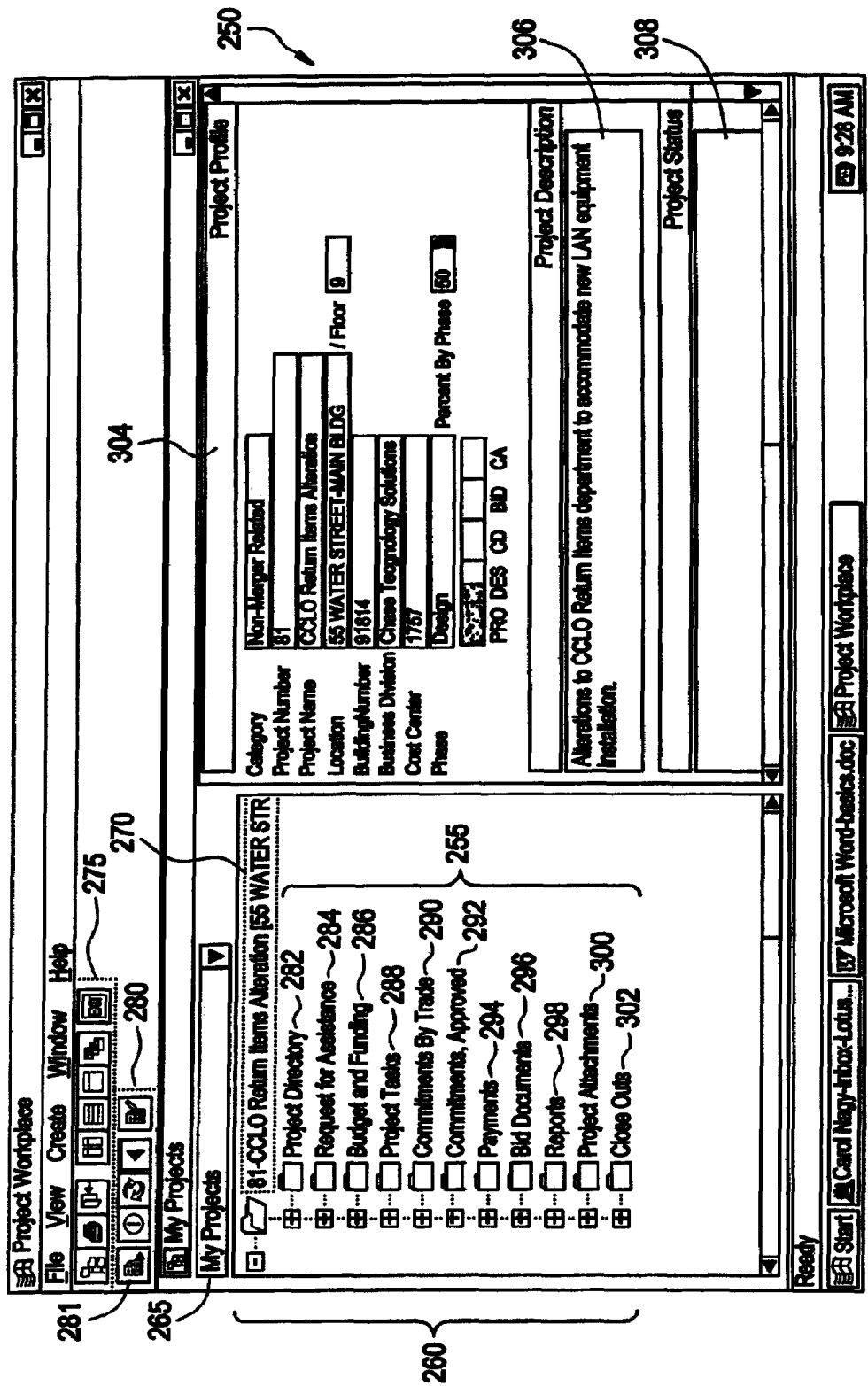
FIG. 3 illustrates the tree structure organization of project management data.

FIG. 2 has depicted the general process of how a project is initiated and managed. The remainder of the Figures will illustrate how system 100 facilitates the initiation management and closure of the project process. As previously described, the workstations for managing the project process (120, 125 in FIG. 1) operate in a windows environment although any other suitable network operating system (e.g., Unix) can be employed. System 100 includes security procedures, such as sign-on procedures, as known by those skilled in the art. FIG. 3 illustrates a typical user interface screen 250 which will help explain the structure and functions of system 100.

Information concerning projects managed by system 100 are preferably organized in folders 255 by projects. In a preferred embodiment, the folders 255 are organized in a tree structure 260. User interface 250 illustrates one tree structure 260 of a particular project 270. System 100 contains various predefined tree views of folders 255 which are selected using list box 265. Specifically illustrated in FIG. 3 is a tree view entitled "My Projects" in list box 265. The tree view of "My Projects" illustrated in FIG. 3 is the standard default view of system 100. The "My Projects" tree view is most frequently used by project managers and other support staff. Other tree views access information in a variety of ways. Other tree views include: a close out master view that lists all of the closed projects; a major expenditure plan view that lists all of the major projects; "my" major expenditure plan view which lists the major projects which a particular project manager is managing; a personal view that is an information folder for use by the user to store data for activities not related to specific projects; a projects by business sector view that lists all of the projects, sorted by major business division; a project by facilities division view that lists all projects sorted by a specific facilities department within the corporation; a view of projects by location that lists all of the projects sorted by location; a view of projects by project manager that lists all of the projects sorted by the project manager managing the project; a projects being supervised view that lists all of the projects being managed by the staff of a manager within the corporation; a view of recently approved documents that lists all of the documents that a user has approved within a predetermined period of time (e.g., two weeks); a view of system tables that lists various categories of system data such as roles, user profiles, and signing authorities; and a vendor view that lists all of the vendors sorted by several categories. Although the above is not an exhausted list of all of the views capable of creation in the system 100 of the present invention, it is a preferred list of the views.

Each of the user interface screens of the system 100 include toolbars 275, 280 containing icons that provide short cuts to the functionality of system 100. In a preferred embodiment, the icons on toolbar 275 are consistent across the user interface screens of system 100. These icons provide basic functionality to all screens such as a button for returning the user to default tree view, a print button which prints the screens, a close button which closes a screen in which the user is currently operating, a tile up button that returns the screen to the standard screen format with the tree view 260 on the left hand portion of the screen and the selected item on the right hand portion of the screen, and an exit button that is used to exit the system.

The icons on toolbar 280 change from screen to screen, depending on the function being performed by the user. Some of the toolbar 280 icons illustrated in FIG. 3 include a new document icon 281 that produces a new document menu; a view notes button that produces a list of all notes created using the notebook feature of the present invention as further described below; a refresh button that renews and updates the tree view after completing an activity; a toggle tree button that toggles between the tree view and a full screen view of the selected item on the right hand portion of the screen; and a create note button that activates the notebook feature of the present invention. The icons on toolbars 275, 280 and other functions of the present invention are accessed using a standard input device of the user's workstation such as a mouse. The mouse is used to click on a button to activate a specific function, to select an item and to drag and drop items of information.

As previously described, information is preferably presented to the user in a tree view 260. The specific tree view illustrated in FIG. 3 illustrates the folders 255 associated with the project 270. The user illustrated in FIG. 3 only has a single project 270, otherwise the other projects associated with the user would be illustrated in the tree view area.

Eleven folders 255 are shown as being associated with the project 270. The project directory folder 282 contains a listing of all of the project team members as well as the project vendors. The list is populated from database 122 (FIG. 1) as individuals or vendors are identified on the project. The Request For Assistance folder 284 contains the approved RFA form as described above. The budget and funding folder 286 contains all budget worksheets and funding documents. These documents include a preliminary funding document, a supplemental funding document and surrogate funding documents. Project task folder 288 contains the project tasks that are set up to assign portions of the approved budget to specific trades (e.g., plumbing) in preparation for creating commitments to vendors. Commitments by trade folder 290 lists all of the commitments that have been prepared for a project (including draft, unapproved and approved commitments). The approved commitments folder 292 contains all of the approved commitments. The payments folder 294 contains all approved invoices from vendors for which payment has been made. The bid documents folder 296 contains all information related to bids and bid waivers. Each bid listed in this folder is assigned a unique number for accounting tracking purposes. Reports folder 298 contains a tracking report with respect to the project which lists all commitments and payments. This folder can also be used to store copies of other reports. Projects attachment folder 300 contains sub-folders for storing scan documents or electronic files of plans, specifications, correspondence, schedules and furniture/finishes information for example. The close out folder 302 contains partial and final close out information with respect to the project. Again, the above list of folders 282-302 is not exhaustive and any folders can be created which suit the needs of the particular project being undertaken or the corporate system in which the system of the present invention operates.

The right hand portion of screen 250 depicts the information associated with the folder selected on the left hand portion of the screen. In this particular example, the project 270 has been selected and accordingly, a profile 304 of the project is displayed on the right hand portion of screen 250. The project profile 304 contains information related to the category of the project, the project number, the project name, the location of the project, the division for which the project is being conducted and the cost center associated with that division as well as the current phase of the project. The project profile further includes a brief project description 306 as well as an area 308 for the project status.

Although not specifically illustrated in FIG. 3, every document within system 100 has its own notebook in which is recorded comments, issues or status information associated with the project. The notebook feature can be activated at any time, such as while preparing a document, during the approval process, or even after final approval. Notes can be saved generally in three different categories. A first category is a comment which includes general notes for the facility staff. A second category of notes is the status of the project which contains on going project status information. This status information from the notebook is displayed in the status area 308 in the project profile area. The final general category of notes contains specific notes to be published to other members of the team such as the clients. The published notes are available to the clients as previously described through the corporate intranet 130.

Figure 4:
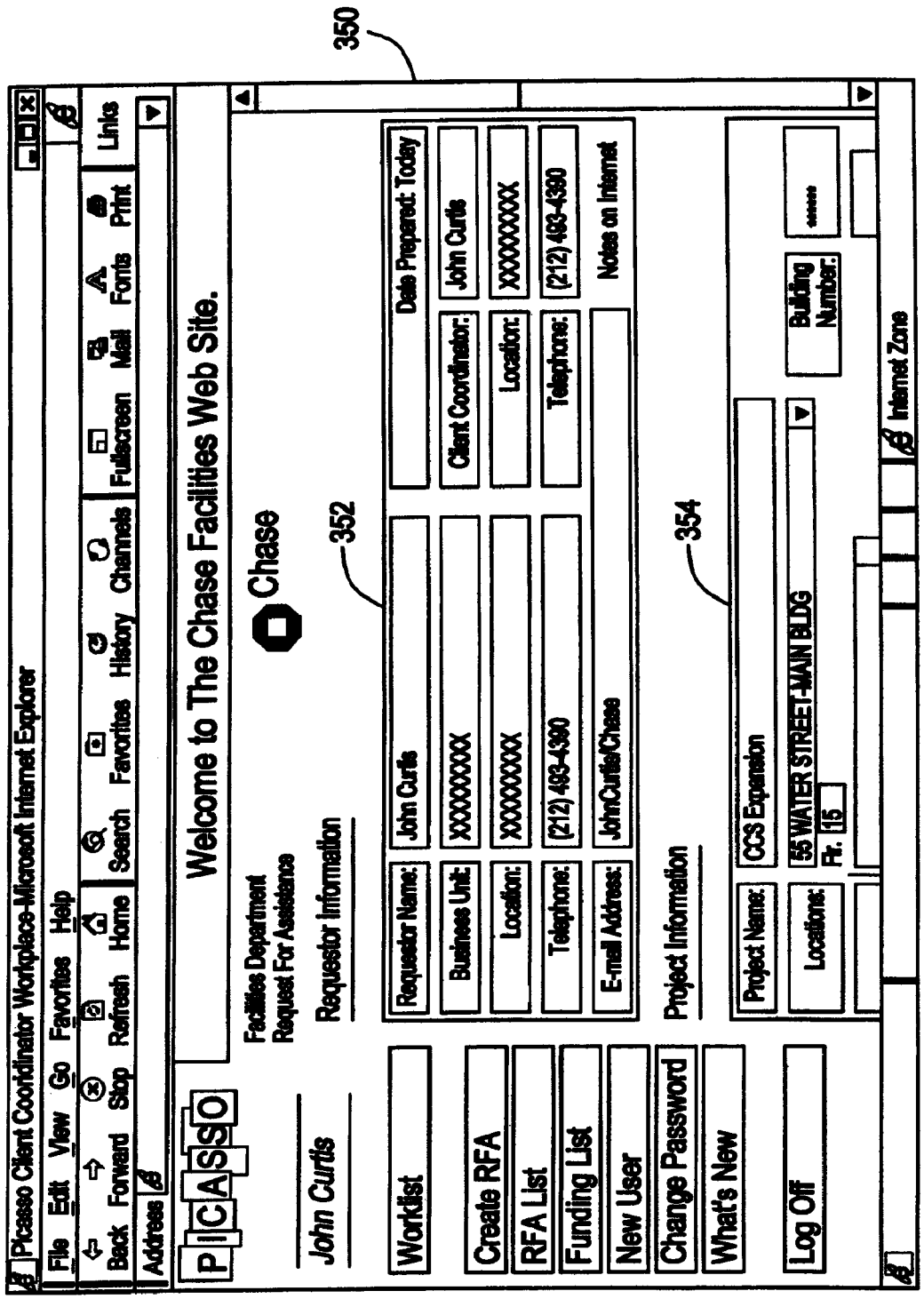
FIG. 4 depicts a user interface input screen for inputting a Request for Assistance.

As previously described, the project management process initiated by a Request for Assistance (RFA). FIG. 4 illustrates an initial user interface screen 350 for creating an RFA. The RFA is prepared either directly by a requestor or by a coordinator within the business unit requiring the project. There are generally two types of information required on an RFA, requester information 352 and information related to the project requested 354. The input screen 350 allows the user to input all of the required information into an electronic RFA form. In a preferred embodiment, the electronic form is used for projects over a predetermined dollar amount (e.g., $10,000). If the project total is less than the predetermined amount, the user can e-mail the project and requestor information to the facility staff. The facility staff can then prepare an internal RFA on behalf of the requestor so that the request can be inputted and managed within the system 100 of the present invention.

Figure 5:
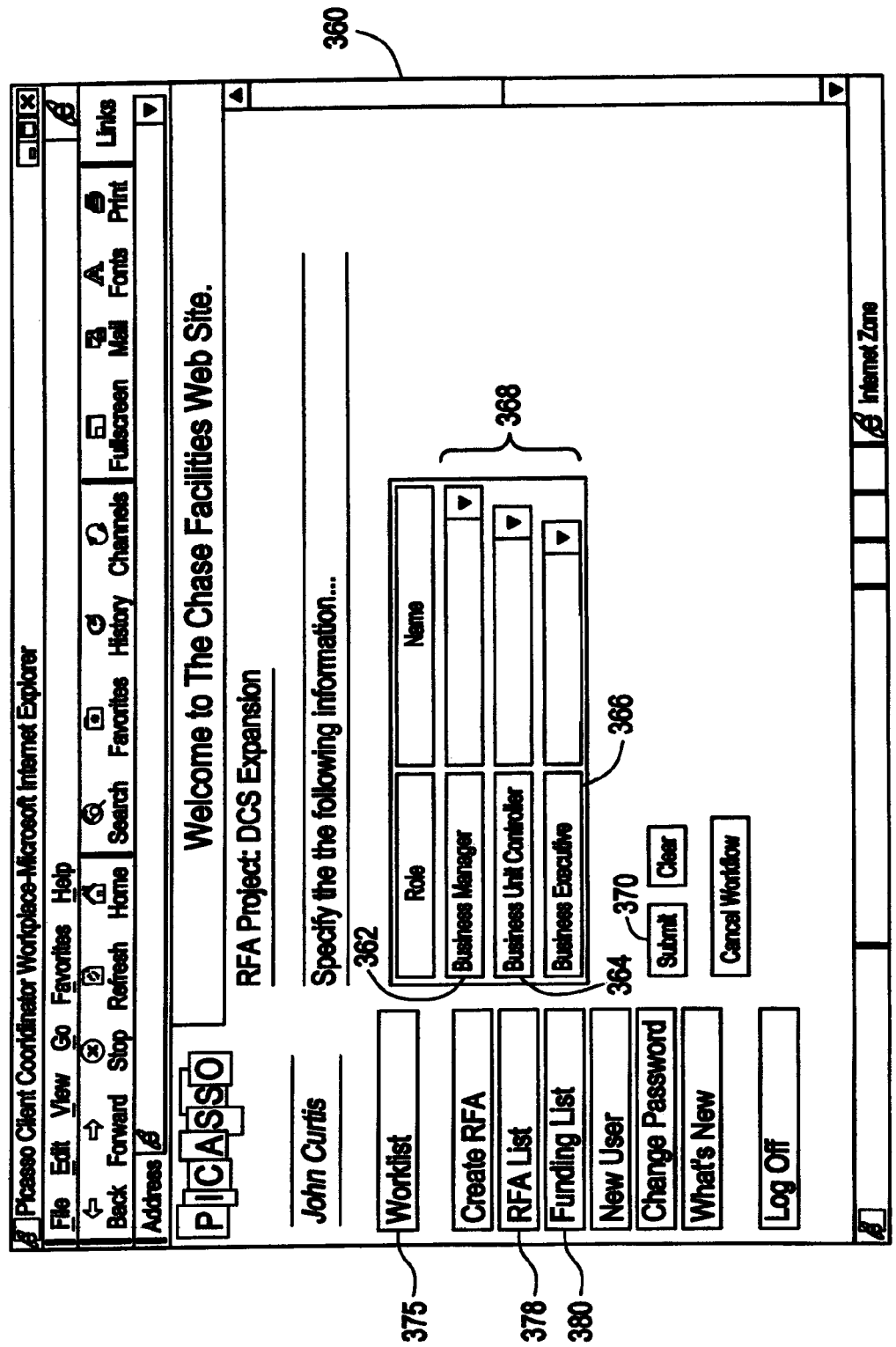
FIG. 5 shows an approval hierarchy structure according to the present invention.

Once the RFA has been completed, the user saves the document and clicks on a button (not shown) to send the RFA for approval. This action brings up a client hierarchy screen 360 illustrated in FIG. 5. This screen represents one of the unique features of the present invention. On screen 360, the user is able to identify the proper personnel required to approve the PFA. In the specific example depicted in FIG. 5, three separate approvals are required for the RFA. The first approval is a business unit manager 362, the second approval by a business unit controller 364 and the final approval by a business executive 366. Different rules are capable of being set in the database 122 of system 100 such that depending on the scope of the project (typically the total dollar amount) the number of approvals will change. For example, for larger projects (e.g., above $100,000) a business unit executive 366 will be required to approve the RFA. In area 368, the user is able to select the actual person who is fulfilling the role required for approval. The database of system 100 contains all of the relevant information with respect to each person in each business unit that can fulfill each role (e.g., name, e-mail address, title, etc.). The user can select the appropriate person from a drop down menu by selecting the down arrow on each box in area 368.

Once the appropriate people have been selected for the approval roles with respect to the RFA, the user clicks on the submit button 370. This action automatically forwards the electronic RFA to the person fulfilling the role of the first level of approval required for the RFA. A notice of the pending RFA requiring approval is added to the workflow list of pending tasks of the approver. This workflow list is accessed by the approver using button 375. When activated, this button provides a list of all of the documents requiring the persons' approval. The approver is then able to click on the notice which will bring up the actual electronic RFA document for review by the approver. After the review is complete, the reviewer is able to type any notes into a comment area of the RFA document and select one of several actions. If the approver approves the RFA, the electronic RFA is sent to the next individual in the approval hierarchy. System 100 enables electronic signatures as is well known to those skilled in the art. The approver can also return the RFA for clarifications to the previous approver or to the requester. Such an action should be accompanied by the approver including notes in the comment area which further define the clarifications required. The approver can also disapprove the RFA which sends the form directly back to the requestor or client coordinator. Again, if the RFA is disapproved, the approver should include notes in the comment area including reasons for the disapproval. Finally, the approver can discontinue the review of the RFA and come back to complete the review at a later time. In this action, the notice of the pending RFA will remain in the approver's work list. If the RFA is approved by the final approver in the client hierarchy, the form is automatically routed to a dispatcher in the project management staff. At this point, the approved RFA is assigned a project number and a project manager.

The automatic approval process of the present invention has several distinct advantages. First, the process is instantaneous. Once a document has been submitted for approval, notice of the receipt of the document for approval is immediately sent to the approver and the document is immediately available for review. This is in sharp contrast to the prior art method of approval in which documents typically were rerouted using interoffice mail. Apart from the delay associated with such a mail system, documents were often lost or misplaced. Tracking the status of approvals using the present invention is as simple as clicking on a button on the user's screen. The prior art required someone to conduct a series of phone calls, e-mails and personal visits to the approvers. Another advantage of the approval hierarchy of the present invention is that it recognized the corporate reality that people often change jobs, responsibilities, and locations. If such a change occurs, the database 122 of system 100 is easily modified to reflect the change. For example, if someone having the role of an approver is promoted and another person takes over the role, the database can be easily modified to replace the promoted person with the successor. Any subsequent approvals will then be automatically forwarded to the successor. Similarly, if someone having a role is on a temporary leave or absence, any task assigned to that person (e.g., approvals) can be easily and temporarily reassigned to a substitute person.

Additional functionality provided to the clients of system 100 is the ability to view a list of RFAs for its business unit by clicking button 378. This button will bring up a window containing all of the RFAs of the business unit. The list will include the project name, the date prepared, the status of the RFA and the status of the funding of the project. In a similar manner, a client is able to view a list of all of the funding documents by clicking on button 380. The funding list will display all of the funding documents for projects on which the user is involved. Once a list is displayed in the system 100 of the present invention, the user is able to view the actual documents associated with the item by selecting the particular item.

Figure 6:
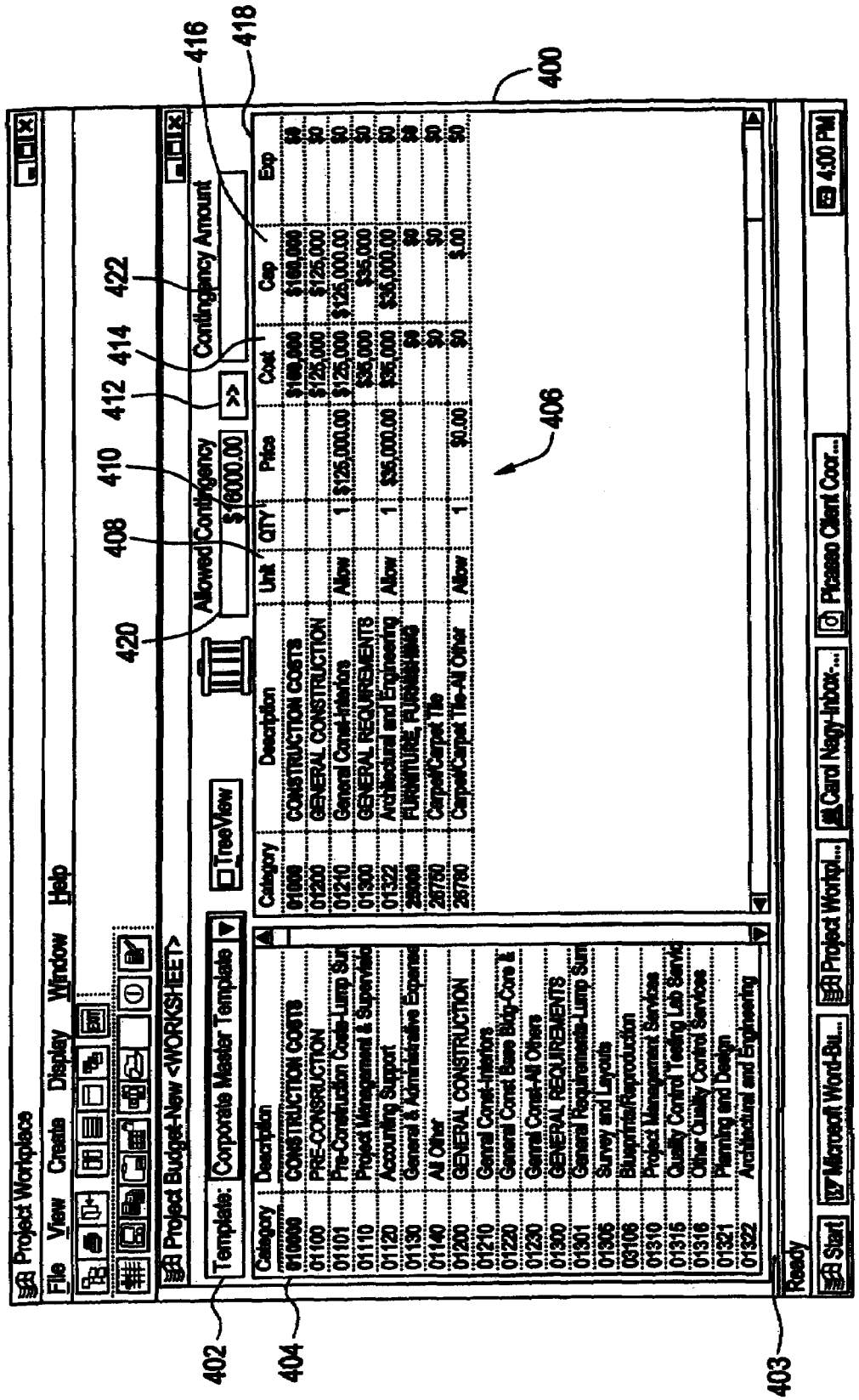
FIG. 6 illustrates a budget template and an example budget.

After the approved RFA has been received by the project staff, one of the first tasks for the project staff is to create a budget and funding documents for the project. FIG. 6 illustrates a user input screen 400 for creating budgets and funding documents. In a preferred embodiment, budgets are created using predefined templates. Area 402 allows the user to view a list of all of the budget templates available within system 100. These templates can either be global (general formats available to all personnel) or private (i.e., templates that the user has personally created for his or her own use). Once a template is selected, the template is displayed in area 403 on the left hand portion of screen 400. In the preferred construction embodiment of the present invention, the templates contain three levels of project information, including individual trades (e.g., lighting fixtures), trade categories (e.g., electrical) and summary categories (e.g., construction, 404 in FIG. 6). The templates in area 403 can be viewed in the standard view as illustrated in FIG. 6, or a tree view as previously described, that shows summary categories in expandable folders.

Once the template is displayed, the user is able to create the unique budget for the project in area 406 by dragging and dropping the items from the template area 403 into the budget area 406. For each item in the budget, the user is required to input the unit 408, quantity 410 and price 412. Once these items 408-412 have been input by the user, system 100 automatically calculates the cost of the item 414. Additionally, system 100 allocates the cost as a capital item 416 or an expense item 418. System 100 additionally calculates an allowed contingency amount 420 which can be set in the system as a percentage of the cost (e.g., 10% of the capital cost). The user is able to increase or decrease this contingency amount in area 422.

If the creation of the budget document lasts longer than the user session, the user can save the budget as a worksheet and come back at a later time and complete the budget. Once the budget has been finalized, it is saved in a final form. The budget is then used to create a funding document that requires approval. The budget is a very complex and detailed document(s) that potentially includes hundreds of trades, capital items, expense items, etc. Rather than have the client and facilities management approve the very detailed budget, the system of the present invention generates a funding document for approval. An example of a funding document is depicted in FIG. 13. The funding document of FIG. 13 was generated by a template accessing data from the database containing the budget. It is appreciated that any template can be used to generate any type or form of funding document desired. As seen in this Figure, the funding document summarizes the capital items for the project 700 as well as the expense items 705. These summaries 700, 705 provide the approvers with an overview of the total spending for the project without the complexity of the details of the entire budget. Further shown in FIG. 13 are the names of the approvers of the funding document as well as the dates of the approval. The funding document indicates approval by both the facilities department 710 as well as the management of the business unit 715.

As previously described with the approval process for an RFA, the project staff member submits the funding document for approval which is automatically forwarded to the facilities hierarchy for approval. Again, the first person in the facilities hierarchy receives a notice in his or her work list regarding the funding document to be approved. The same automatic forwarding of approved documents is follows as described above with respect to an RFA. Again, if at any level of the approval process the reviewer denies approval or requests further clarification, the funding document is automatically returned to the previous approver with notes in the comments section providing reasons for the disapproval or the required clarification. Once the funding document has been approved by all levels of the facilities hierarchy, it is automatically forwarded to the client hierarchy for its approval. In a preferred embodiment, the client business unit has a similar level hierarchy for approvals, depending on the scope and size of the project. The same approval process is repeated within the client business unit including automatic forwarding of approved funding documents. Once the funding document has received final approval from the client hierarchy, it is automatically forwarded to the assigned project manager who acknowledges the approved funding document. The funds are now available for commitments and the process of managing the project begins.

With the approved RFA and budget in place, the project manager is able to begin the actual project management. This process starts with the project manager generating commitments to vendors for various aspects of the projects. In the preferred construction embodiment of the present invention, the commitments include: architectural/engineering on calls; Purchase Orders; bids; bid waivers; contracts; change orders; and work orders. Architectural/engineering on-calls are commitments for on-call consultant services which typically result in the generation of a purchase order. A Purchase Order is a commitment for goods, materials, equipment or services, typically up to a predetermined dollar amount (e.g., $25,000). In the preferred embodiment, commitments over the predetermined amount (e.g., $25,000), require competitive bids. Again, these bids result in purchase orders for goods, materials and equipment or contracts for the provision of services. Alternatively, for commitments over the predetermined dollar amount, biding can be waived pursuant to a special bid waiver approval process. Work orders are commitments made against a master contract with a vendor for certain services of any dollar amount and for other trade services up to a predetermined amount (e.g., $10,000). Change orders are amendments to previously approved purchase orders or contracts, either increasing or decreasing the dollar amount. The change order results in a revised purchase order or a revised contract.

The commitments are created against the previously approved funding and begin with the creation of a project task that assigns a portion of the approved budget to a specific trade. In order to create a project task for a commitment, the project manager selects the new document icon (281 in FIG. 3) to create the task. Activation of this icon 281 displays a document selection menu which includes the various documents which the project manager is able to create. A selection exists for each of the above-identified types of commitments (e.g., an on-call commitment). By selecting one of the items, the project manager is required to complete a description of the project task including the trade, the protocol for the commitment (e.g., source, bid, waived bid, negotiated, national contract), the type of commitment (e.g., purchase order, contract, work order) the tax status of the commitment (e.g., taxable, nontaxable) and a detailed description of the scope of work to perform pursuant to the commitment.

The project manager is further required to complete a trade code details section. All of the trade codes that are contained within the approved budget are displayed (e.g., electrical). The project manager is able to drag and drop the applicable trades from the project budget to the trade code portion of the project task. The project manager then types in the dollar amount for each applicable trade for the commitment. Once the project manager has completed the above, the project manager saves the project task and is then able to generate the actual commitment.

Figure 7:
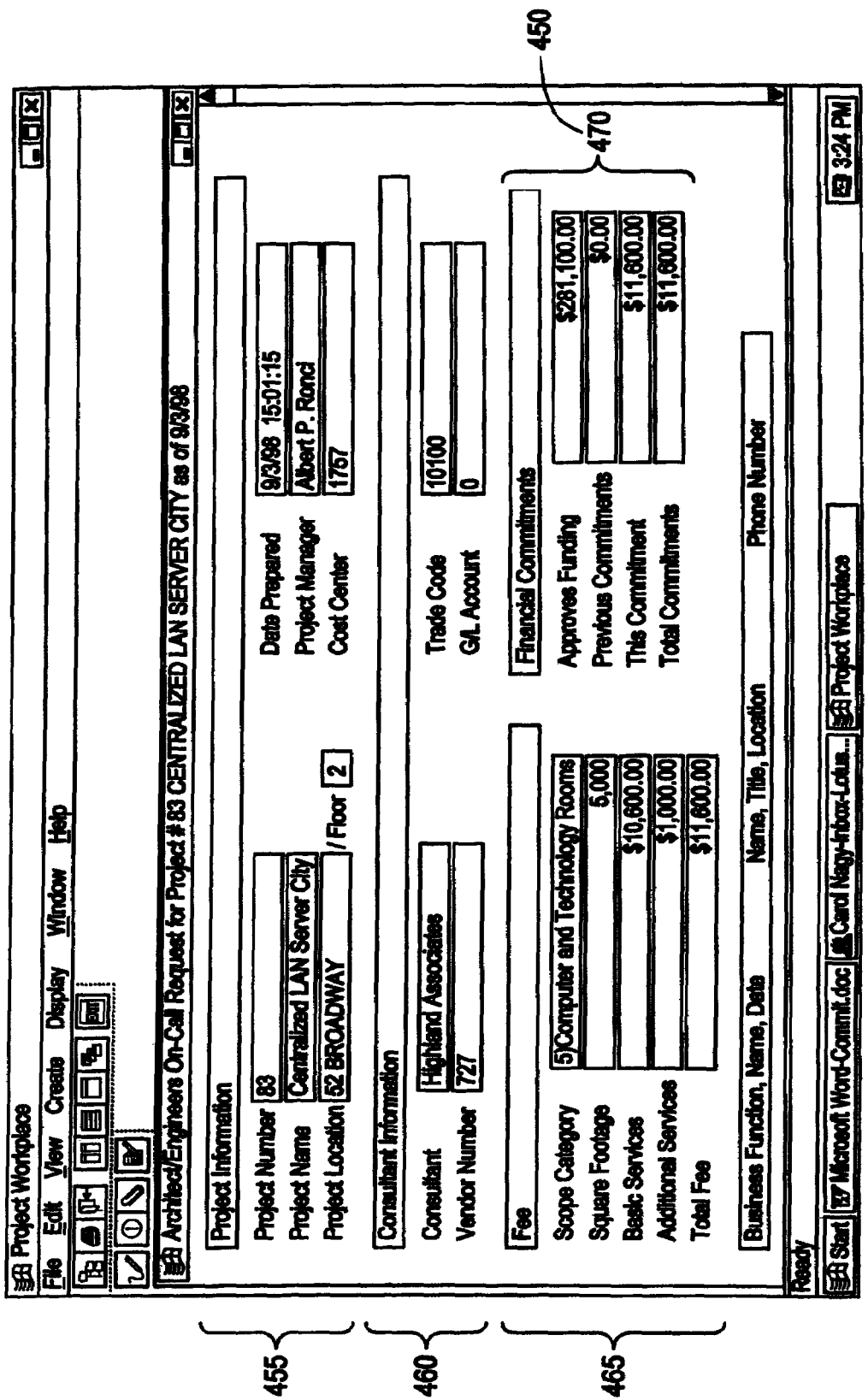
FIG. 7 depicts an On-call commitment to a vendor.

FIG. 7 illustrates a complete commitment request 450 for an architectural/engineering on-call. In creating this commitment 450, the project manager was prompted to enter information related to the project 455, information related to the consultant (vendor) 460, the scope of the job and the square footage affected and the fees associated therewith 465, as well as a summary of the funding and financial commitments 470, both with respect to this particular commitments and the project in total. Many of the items found on this on-call commitment were obtained from pull down menus (not shown) such as the consultant. Other items such as the cost center to be changed for work performed are provided by system 100 as a default once the project number is inputted by the project manager. Once the on-call commitment has been completed by the project manager, the project manager submits the commitment for approval to the project staff. As previously described, the approval process is automatic, with each level of approval being able to approve the document, disapprove the document or return the document for clarification.

In addition to the electronic commitment, system 100 provides the project manager with the capability of scanning in additional documents that are associated with the commitment or creating any attachment such as spreadsheets, JPEG files, drawings. In the preferred embodiment, such attachments are created using Object Linking and Embedding (OLE) compliant software. Additional documents attached to a commitment may include proposals from the consultant or vendor. These attachments are available for review by the approvers at their work stations by selecting a view menu and selecting the attachments choice on the view menu (not shown).

Once an on-call commitment request has received final approval, system 100 automatically generates a purchase order number and notifies the project manager (electronically) of the purchase order number. A hard copy of the purchase order is issued by the project staff to the vendor. Preferably, the vendor is also able to obtain an electronic copy of the purchase order through the Internet interface previously described with respect to FIG. 1. The purchase order contains all of the basic information contained in the on-call commitment request as illustrated in FIG. 7. In the preferred embodiment, when the vendor opens the electronic purchase order (or other document such as a contract or a change order), the vendor is presented with a set of appropriate functions. For example, for contracts, a command button will be provided to Agree to the terms or Not Agree with an opportunity to comment or create addendum. The Agree function invokes an electronic signature process. Some functionality may not be available based on the stage of a particular process. For example, invoices cannot be created until a work document has been accepted.

In the preferred embodiment, records relating to a vendor remain available in system 100 for a period of at least one year following the job's completion. Documents the vendor can author include Bids, RFQs, Invoices, Punch Lists, Lien Waivers and Messages. Documents the vendor can receive and process with limited functionality are Request for Proposals, Contracts, Work/Purchase Orders, Change Orders, Payment Confirmations and Meeting notices. In this preferred embodiment, the vendor is only allowed to view documents they authored or documents intended for them. The ability to delete documents are limited from a vendor's perspective and may only be allowed depending on the state of a document. This will provide for a document draft feature prior to posting to the workflow.

The generation of a project task for purchase orders is the same as described above with respect to on-call commitments. FIG. 8 illustrates a request for a purchase order commitment 475 generated by system 100 of the present invention. The project profile information 455 is the same as described above with respect to the on-call commitment. The commitment information 480 includes the trade involved, the type of commitment (a purchase order in this example) and the protocol for the commitment. The vendor information 485 describes the vendor to which the Purchase Order is to be issued. Again, this information can be input by the project manager using drag and drop methods previously described from a master list of vendors for the selected trade. The selection of vendors can either by from all of the vendors contained in the system or from vendors with which the corporation has a master contract. The cost associated with the purchase order is entered in area 490 and the summary of the financial commitments is again listed in area 470. As with the on-call commitment described above, the project manager is able to scan non-electronic documents into the system for attachment to the purchase order. Once the purchase order request has been saved, it can be submitted for approval and proceeds through the approval hierarchy as previously described. Upon final approval, the purchase order is issued to the vendor with notification being made to the project manager electronically.

Figure 9:
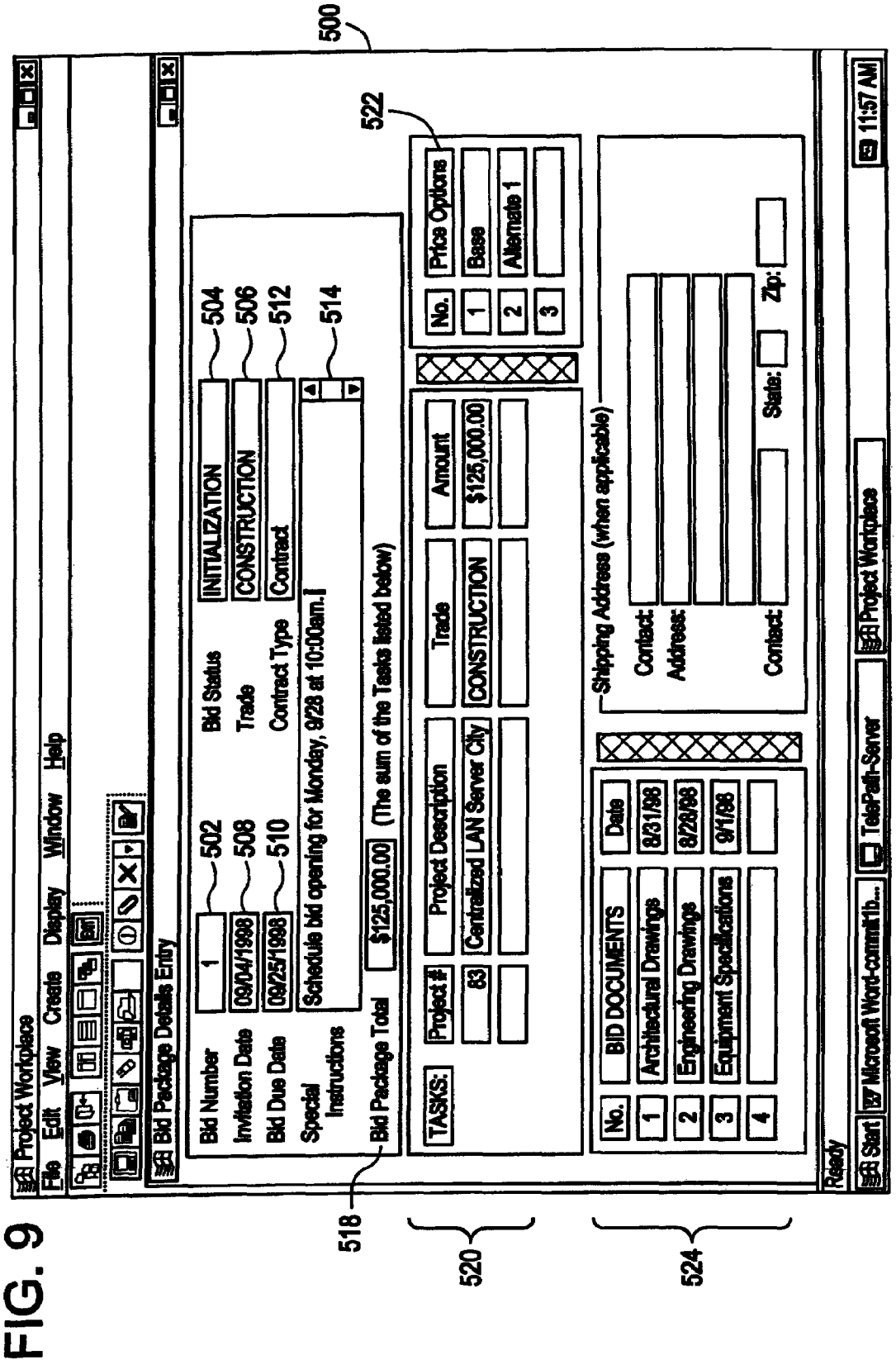
FIG. 9 illustrates the creation of a bid package.

A project task for a bid is again created as described above. Once the project task has been created, the project manager is then able to create a bid package 500 as illustrated in FIG. 9. System 100 automatically assigns a bid number 502 to the bid package as well as assigning the bid status 504 of "initialization". As previously described, a bid is an object that can have many documents associated therewith. Each document can have a separate approval process as described above. There is not necessarily a one to one relationship between documents and the object with which they are associated. The trade 506 is obtained by the system from the information provided by the project manager in the creation of the project task. The project manager then inputs the invitation and bid due dates 508 and 510 as required by the project. The contract type 512 is selected by the project manager from a pull down menu (not shown). The project manager further inputs any special instruction in area 514. The bid package total 518 is automatically calculated by the system as the sum of the tasks 520. The tasks 520 are initially populated by system 100 from the entries input the project manager when creating the project task. The project manager can add additional tasks in area 520 that he or she desires to be bid upon. The task can relate to the same project number or be associated with different projects. The price options 522 defaults to a base price, but the project manager can select alternative pricing options from a pull down menu (not shown). The documents supporting the bid are listed in area 524 and include such documents as architectural or engineering drawings as well as equipment specifications.

Once the bid package has been saved. The project manger is provided with a bid package vendor selection screen that allows the project manger to choose the vendors from which bids will be requested. Again, the project manager is able to select the vendors from a list complied from the database 122 in system 100. Once the project manager has finished selecting the vendors from which bids will be requested, the list is saved and submitted for automatic approval as described above. Once the list of proposed bidders has been approved, the bid package is sent to each of the bidders in hard copy form and preferably in electronic form.

Figure 10:
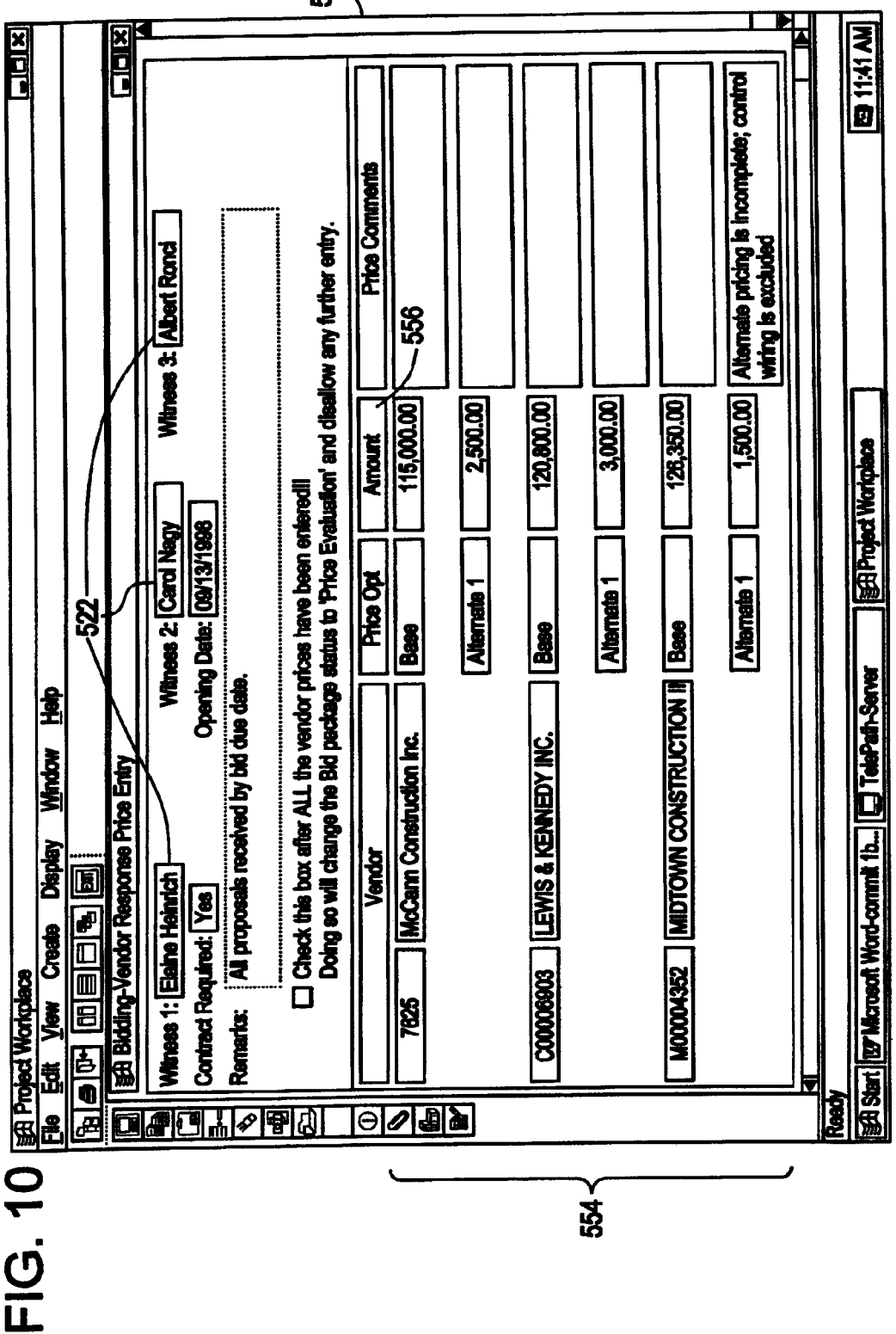
FIG. 10 illustrates the bid opening processing.

Prior to the bid due date, the bidders submit their bid proposals in response to the bid package. Due to legal concerns, it its preferable that the bids be opened and witnessed by two and preferably three witnesses. FIG. 10 illustrates an input screen 550 used for conducting the bid opening. As illustrated in this Figure, three witnesses 552 are provided. System 100 requires these witnesses 552 to input their IDs and passwords when conducting the bid opening. As each bid is open, the information from each vendor is input into area 554. The vendor name and the price options are defaulted by the system 100 from the approved proposed bidder list previously described. The amount 556 is obtained from the vendors bid and is input into the system by the project staff. Additionally, the actual bid documents are scanned into system 100 and linked as attachment to the project. Once all of the bids from the selected bidders have been entered, the bid responses on screen 550 is saved and the bid opening is officially closed. The project manager is now able to perform an evaluation of the bids.

Figure 11:
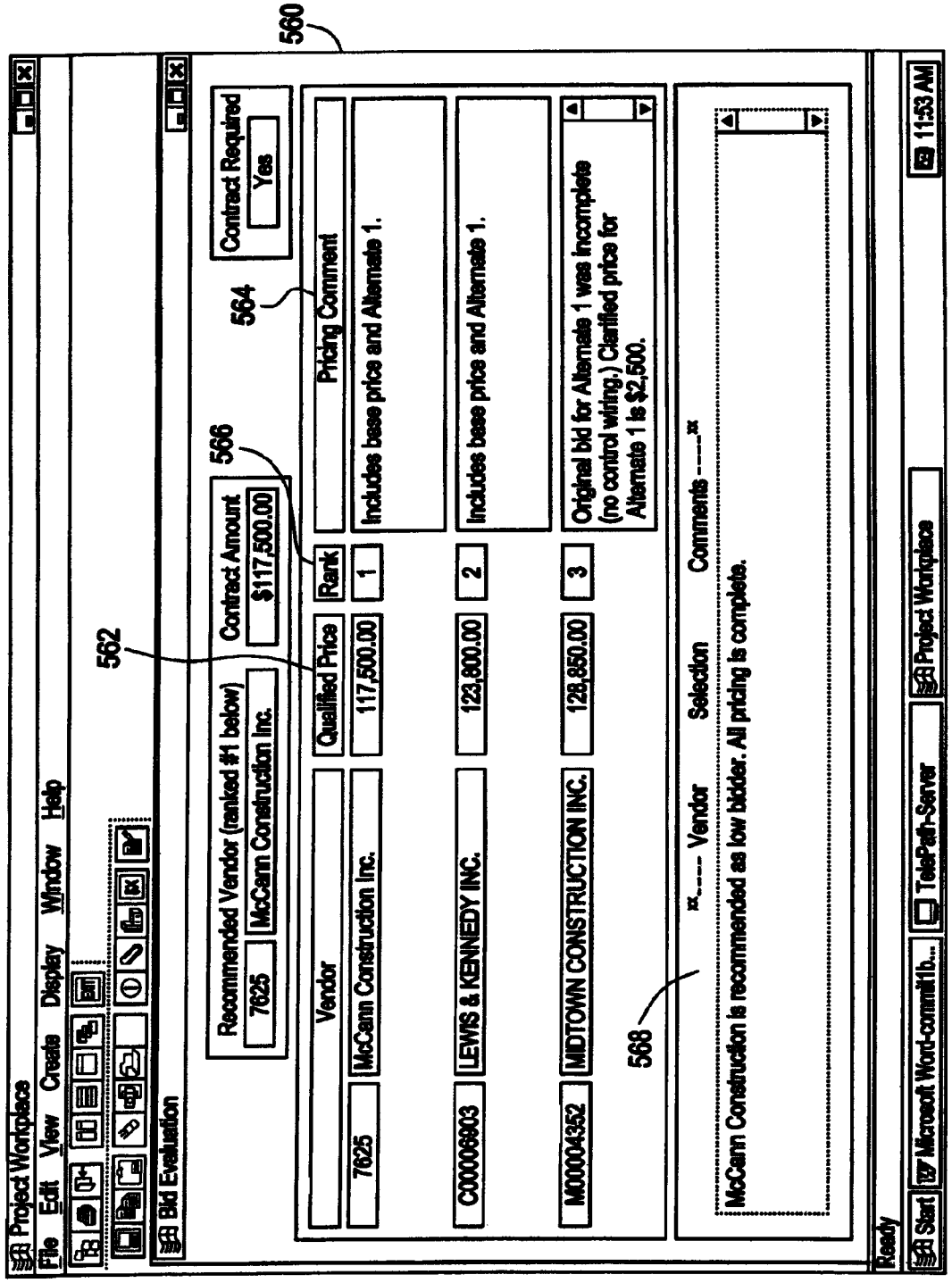
FIG. 11 depicts the processing of bid responses from vendors.

In performing the bid evaluation, the project manager selects the bid documents folder (296 in FIG. 3) to view the various bids. The bid documents folder contains all of the bids associated with the selected project. Selecting a modify button (not shown) activates a bid evaluation screen 560 as illustrated in FIG. 11. As seen in screen 560, each of the bidding vendors is displayed. The project manager is able to enter a qualified price 562 which is either the bid amount submitted by the vendor during the bidding process or an adjusted amount due to clarifications with the vendor after the bid has been opened. The project manager is additionally able to enter any comments on the pricing in area 564 with respect to each of the vendors. The project manager is then required to rank the vendors in area 566 and provide a reason for selecting a particular vendor in area 568. If addition documents have been submitted by the vendors, they can be scanned in and attached to the data for project as well as other attachment such as drawings. Once the project manager has completed his or her ranking 556, the bid evaluation is saved and submitted for approval. The automatic approval process proceeds as described above with respect to the approval hierarchy.

The above has described a process for creating and approving three types of commitments, namely architecture/engineering on calls, purchase orders and bids. Similar processes are performed for the creation and approval of bid waivers, work orders and change orders. These processes shall not be specifically described herein, those skilled in the art appreciated how such processes are accomplished.

After the commitments have been made to the various vendors and the work has been completed, the vendors submitted invoices for the services and materials provided pursuant to the commitments. In a preferred embodiment of the present invention, the invoices are electronically transmitted from a vendor workstation 140 (FIG. 1) through the Internet 145 and the firewall 150 for receipt by system 100. Alternatively, paper invoices may be submitted, scanned and the data entered into the system either manually or through drag and drop methods. The project manager reviews the invoice data contained in system 100 against the scanned copy and makes any necessary adjustments in the payment amount, retainage, freight/delivery or tax, based on the actual goods or services provided.

Figure 12:
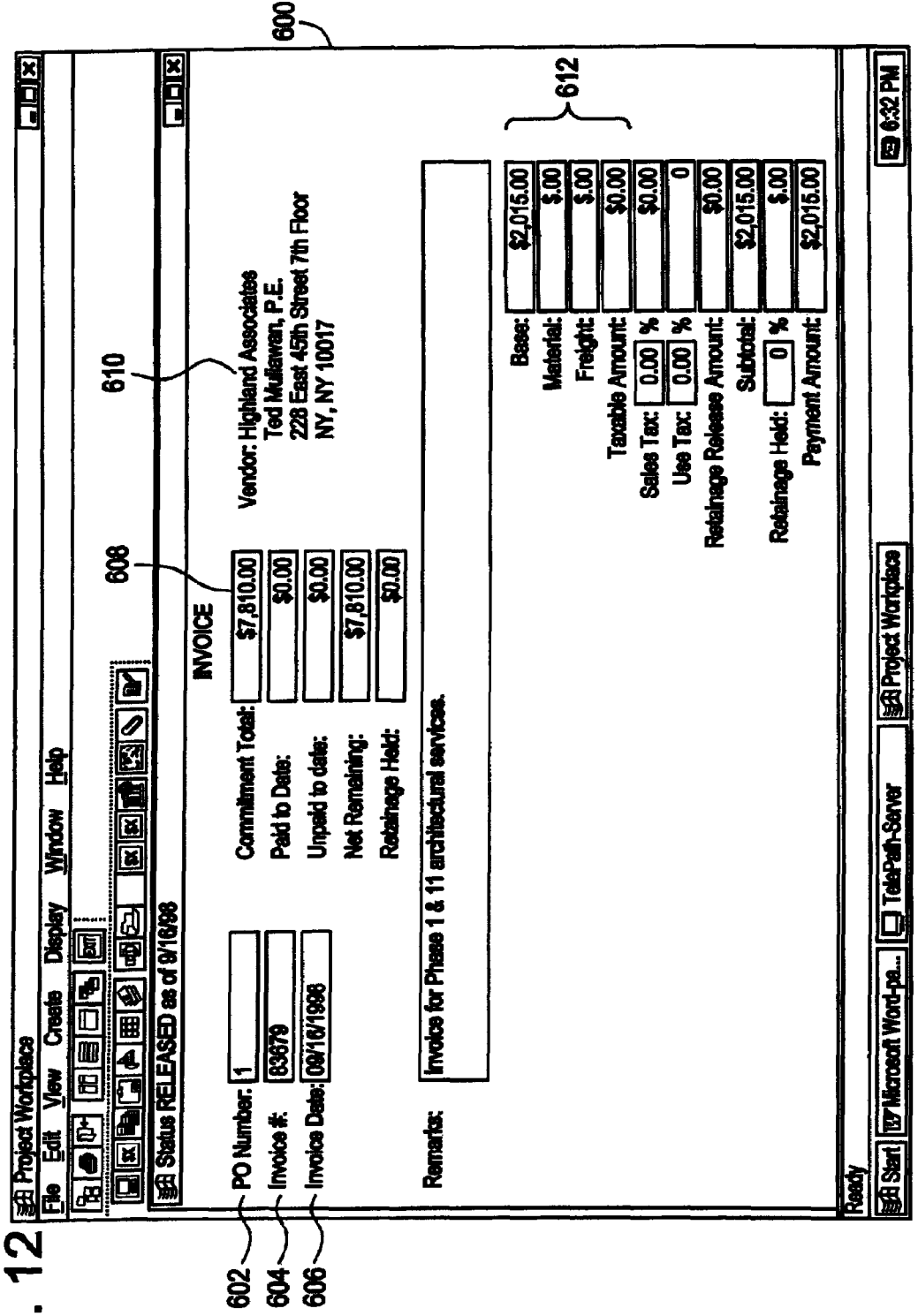
FIG. 12 shows the processing of a vendor invoice.

FIG. 12 illustrates an example of an invoice data entry screen 600. After an invoice has been received, the purchase order number 602, the invoice number 604 and the invoice date 606 are entered. System 100, using the purchase order number 602, automatically fills in the commitment information 608 as well as the vendor information 610. The amount of the invoice including the material amount, the freight amount and the taxable amount are entered in area 612. Once the data has been entered on invoice data entry screen 600, the data is saved and submitted for approval. The invoice approval process follows the approval hierarchy described above with respect to the other documents generated by the system. In a preferred embodiment, if the invoice amount does not exceed the commitment amount, the project manager alone can approve the invoice. If the invoice amount does exceed the commitment amount, the project manager can prepare a change order. The change order requires approval through the hierarchy and the issuance of a revised purchase order reflecting the adjusted commitment amount. Once the invoice has been approved, the payment can be made to the vendor either through the issuance as by check, crediting of the vendors demand deposit account, or through other EDI means.

One further advantage of the present invention is the automatic nature of the tracking of the accounting information. A general rule is that any required accounting information (e.g., the business unit to which items will be charged) is captured by the system as soon as possible and thereafter carried through throughout the project. For example, once the client identifies the business unit to be charged, this identification is automatically carried into the templates for the project, commitments and invoices. All documents created from these templates will therefore automatically carry the identification of the business unit to be charged.

As briefly described above, one of the features of the present invention is the ability to automate the close out process. The process of closing out a project has historically been an arduous and manually intensive process. As previously described, the preferred embodiment of the present invention relates to construction projects, and the close out process will be described in terms of this embodiment. The closeout procedures of the present invention automate the financial transactions associated with the following two processes: handling of a project's CIP (construction-in-progress) account balance; and the final closing of a project.

The CIP account is a holding account that captures a construction project's capital expenditures. At the end of the project, the balance in the CIP account is passed to a fixed asset (F/A) account for depreciation. Until the asset has been thus transferred, it cannot be depreciated. After the balance is passed to a fixed account it starts depreciating thus creating depreciation expenses for portion of the corporation that is benefiting from the project. There is no hard requirement for the construction project to be 100% complete in order to commence depreciation. Depreciation can start with the payment of the first invoice with respect to the project. Typically, financial accounting rules governing construction projects employ an 80% threshold for commencing depreciation (i.e., 80% of the project must be complete before depreciation is started). The specifics of a project might require for the depreciation to be started both before or after an 80% threshold is reached.

As previously described, many of the processes of the method and system of the present invention are driven by the documents related to the project. The final closing of a project in the system of the present invention is a system controlled procedure that starts with automatic examination of various states of the project documents. As a result of this thorough examination, the system produces an on-line diagnostics which highlights all inconsistencies detected by the process. The problems are categorized and displayed for the project manager.

The system performs several types functions related to close outs, including a partial close out, a full close out, abort a close out and cancel a close out. A partial closeout is a type of closeout that is done when there is a need to move a portion of CIP balance to a F/A account. On larger projects, either in terms of funds and or the period of time for completing the entire project, having multiple partial closeouts is a very useful function practical. A full closeout is a type of closeout that is performed by the project manager only once. After successful completion of full closeout the project is closed to any further activity (including commitments and payments). A Cancel closeout is a type of closeout that is performed by the project manager in a case where a project was initiated in the system of the present invention but, before any commitments were issued to the vendors or any invoices were paid, the decision was made to stop it. An abort closeout is a type of closeout that is performed by a project manager when the client requested to stop the project after the funding was approved, commitments were issued and/or invoices were paid.

A trigger built in the system initiates the first partial closeout for a project when the payment of a particular invoice meets the 80% threshold. The 80% threshold is with respect to the entire project. This trigger for a partial close out can be set to occur with respect to any event that is kept track of in the system. For example if there are several phases of a project, the trigger can cause a partial closeout at the completion of a particular phase. The trigger initiates a workflow process gets started that opens a closeout session. The system automatically links all of the paid invoices for the project to the closeout session created by the trigger.

The system also generates a substantial number (sometimes hundreds) of financial transactions that will be sent to the General Ledger (G/L).

The work flow process sends the generated transactions to an analyst in the financial area. After reviewing the transactions, the analyst approves the session. This single automated procedure alone replaces a substantial manual effort (document collection, data entry, data validation, etc.,) which would take weeks or even months to complete. The financial analyst can request that the system start a partial closeout if needed. In the preferred embodiment, there is no system-imposed limit on the number of partial closeouts that can be processed by the system.

Figure 14:
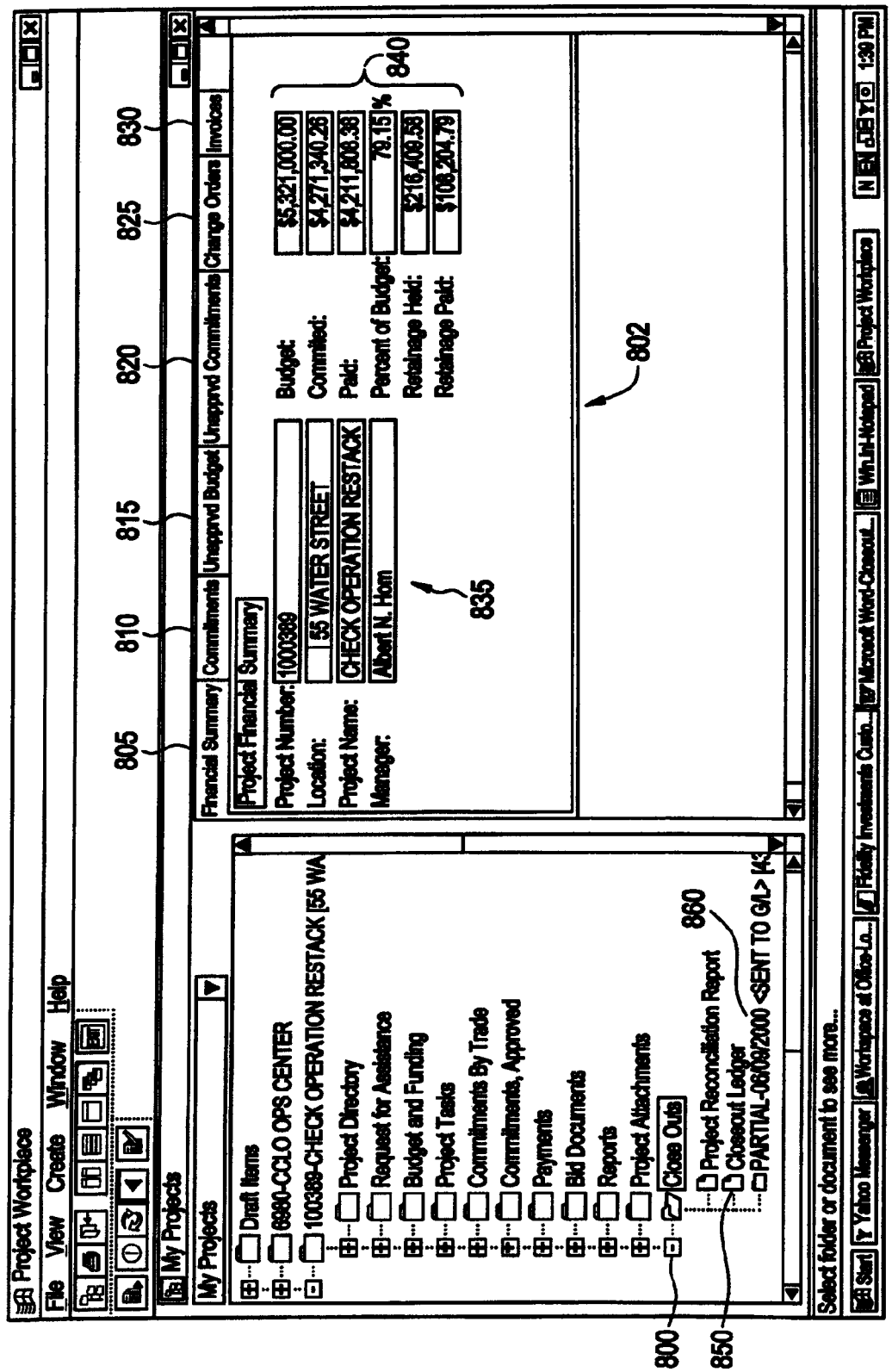
FIG. 14 depicts the close out information available to a project manager.

FIG. 14 illustrates the close out information that the system makes available to the project manager. As previously described with respect to FIG. 3, the tree structure of folders in the project manager's directory includes a close out folder 800. Opening the close out folder brings up the screen 802 seen in the left hand portion of FIG. 14. Close out screen 802 contains six tabs 805-830 for viewing further information with respect to the status of the various close outs with respect to a project.

As illustrated in screen 802 in FIG. 14, the Financial Summary tab 805 displays a summary of the overall financial status of the project. Information in area 835 provides identification of the project, while the information in area 840 summarized the actual financials. The financial information in area 840 includes the budget for the project, the amount of the budget that has been committed, the amount of the commitments that have been paid, the percentage of the budget that has been paid, the retainage held and the retainage paid. On this single summary screen 802, the project manager is quickly able to obtain a summary of the progress, from the financial point of view, of the project.

Each of the other tabs, commitments 810, unapproved budget 815, unapproved commitments 820, change orders 825 and invoices 830 respectively bring up screen that detail the status of the subject matter related to the items associated with the tab. For example, the commitments tab 820 brings up a screen (not shown) that shows in detail all of the commitments that were created in the system. For each commitment, the screen shows the vendor to which the commitment has made, the category (e.g., construction, move) the amount of the commitment, the amount paid to date and the remaining balance of the commitment. The remainder of the tabs 810-830 bring up similar screens that list all of the items associated with the tab.

Figure 15:
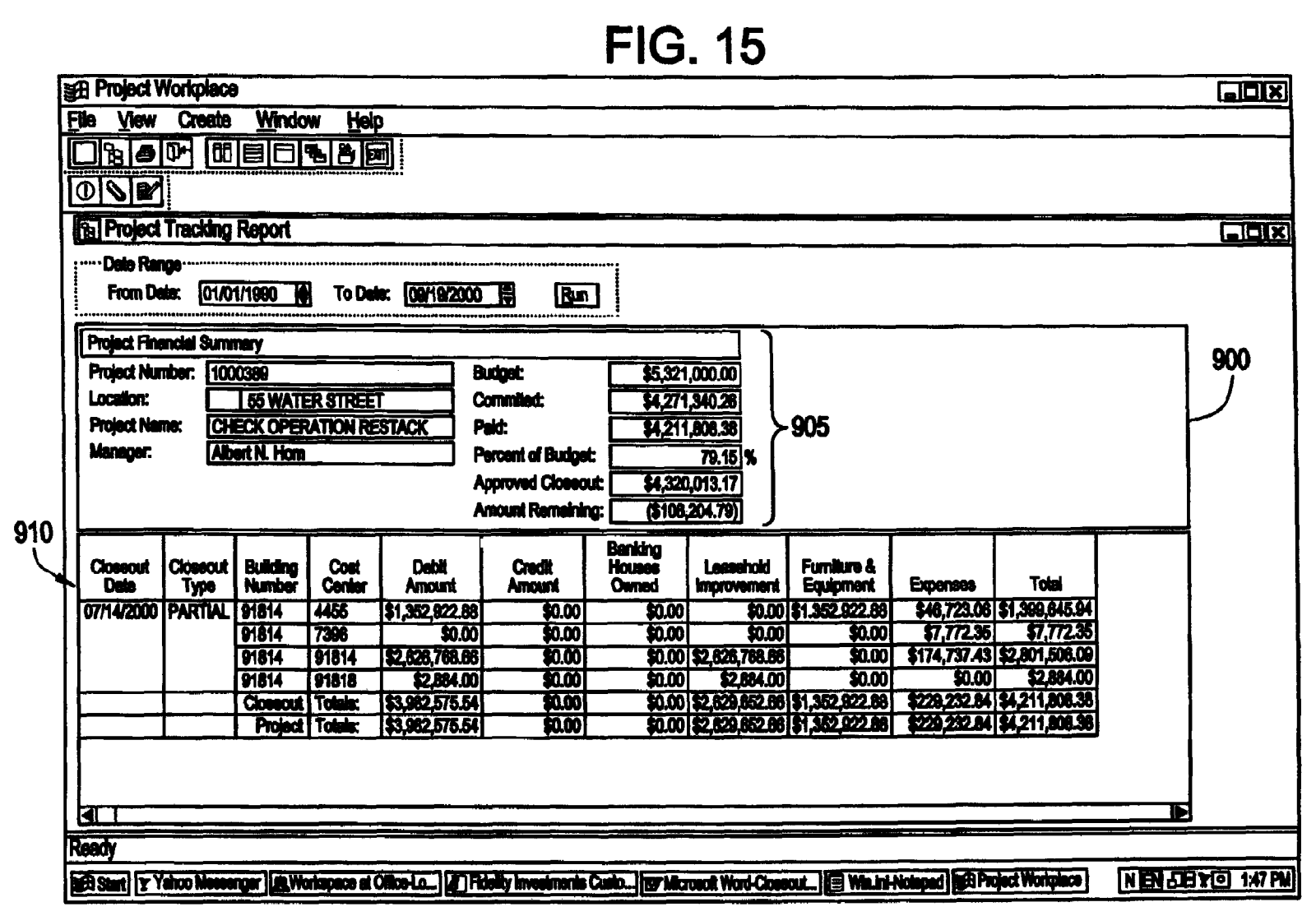
Figure 16:
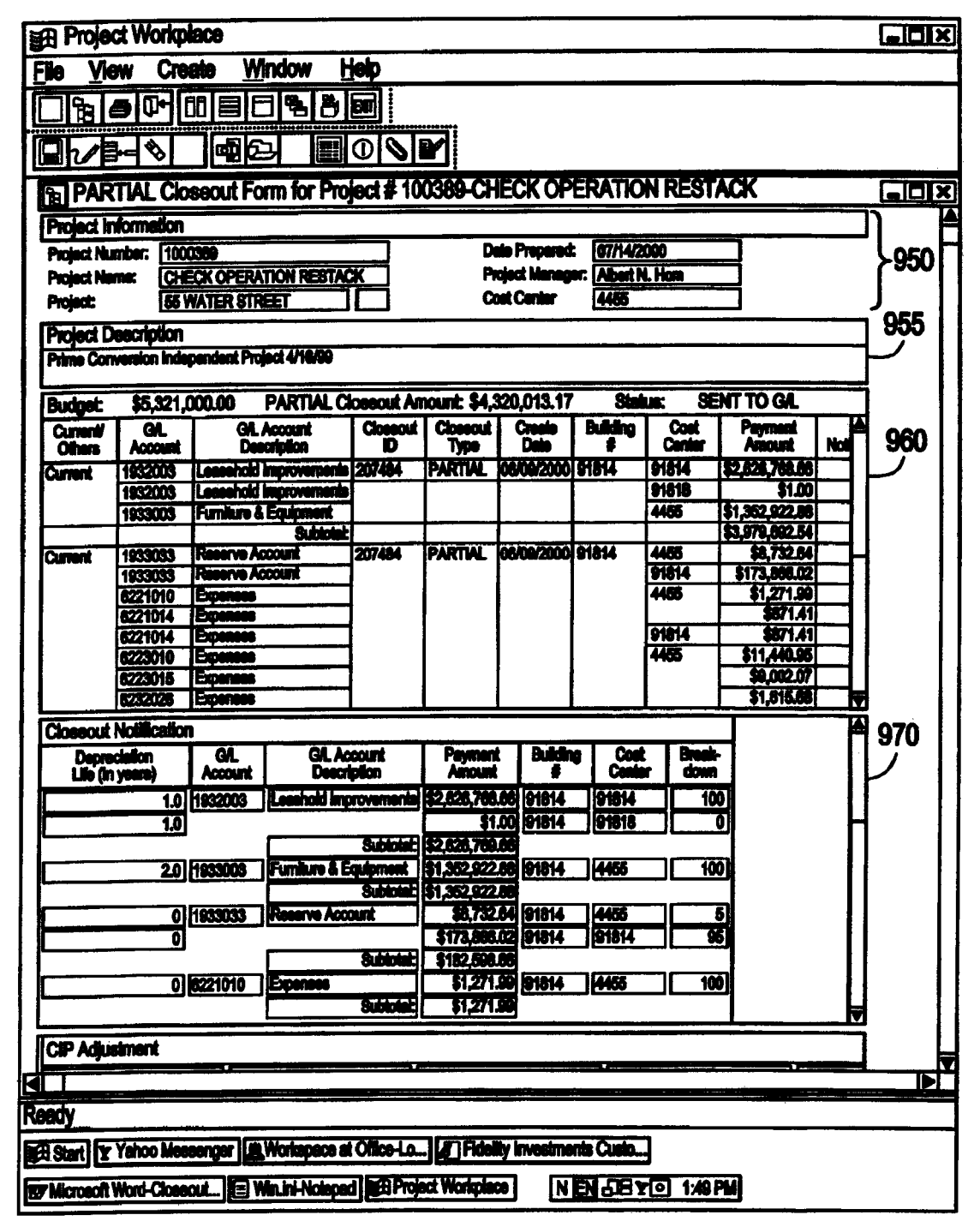

The folders Closeout Ledger 850 and Partial 860 in the project manager's tree directory contain further information related to the closeout status. The closeout ledger folder 850 bring up a screen 900 as illustrated in FIG. 15. This ledger screen 900 includes a summary are 905 and a detailed area 910. Within the detailed area 910, there is an entry for each of the closeouts associated with the project. In the particular example depicted in this Figure, only a single partial closeout has been executed with respect to the project. FIG. 16 illustrates the details associated with a partial closeout. Area 950 lists the project information and the project details are listed in area 955. Area 960 contains the details as to the G/L accounts to which the items in the partial closeout were assigned. Area 970 details the different G/L accounts to which items were posted as well as the depreciation schedule that is assigned to the items.

When a project has been completed, the project manager initiates a final closeout. Again, the full level of automation associated with the partial closeout as described above is applied to the full close out. In contrast to a partial closeout though, additional tests are performed to make sure that no unfinished business associated with the project is left unattended. For example, one test is performed to expose any unpaid invoices. Another test is performed to identify any commitment that is not fully paid. A further test is performed to identify any credit from a third party (e.g. a real estate) due to the project that is not collected. And so on. A full diagnostic of the state of the project is presented to the project manager in a manner of seconds and a list of actions required is fully identified. In the prior art manual process, this undertaking would have required days if not weeks to complete.

To close projects that were canceled before they were started and those that were stopped after they were started, two other types of closeout processing are performed as previously described, Cancel closeouts and Abort closeouts. Various tests are performed by the system to help the project manager to handle these exceptional conditions correctly.

Although the present invention has been described in relation to particular embodiments thereof, many other variations and other uses will be apparent to those skilled in the art. It is preferred, therefore, that the present invention be limited not by the specific disclosure herein, but only by the appended claims.

What is claimed is:

1. A computer implemented method for managing a construction project using a processing system, the method comprising:
    establishing a database in the processing system, the processing system maintained by a project management entity;
    providing funding approval associated with the project through a funding approval process, the funding approval being effected in association with a document collection associated with the project, the document collection maintained in the database, the document collection including a plurality of documents;
    performing the funding approval process for the project in the processing system, the funding approval process including:
        identifying approvers that comprise an approval hierarchy, the approval hierarchy being a series of approvers;
        automatically forwarding a notice requesting approval of at least one electronic document, in the document collection, from a previous approver to a successive one of the approvers upon approval of the at least one electronic document by the previous approver in the approval hierarchy; and
        wherein the successive one of the approvers returns the funding approval to the previous approver, the previous approver not being a requestor, the successive one of the approvers returns the funding approval to the requestor;
    accessing the document collection in the database by a vendor;
    the vendor entering and submitting electronically information related to the project;
    the vendor determining that funding approval for the project has been secured through access to the document collection;
    transferring monetary funds to the vendor after a predetermined event has occurred;
    wherein the predetermined event is the completion of a portion of the project associated with the vendor, and upon completion of the portion of the project associated with the vendor, the vendor submits an invoice via the system, wherein the invoice is electronically transmitted from a vendor workstation;
    obtaining an invoice from each vendor once the respective vendor's portion of the project is completed;
    subsequent to submission of the invoice by the vendor, a payment associated with the invoice goes through a validation process and is charged against portions of a contract associated with the project;
    providing a contract to the vendor, the contract defining tasks to be performed by the vendor, the contract included in the document collection;
    generating, by the processing system, a list of all projects associated with a particular user, each of the projects associated with a document collection;
    wherein each of the plurality of documents in the document collection being associated with a respective electronic notebook, the documents in the document collection being electronic documents, each electronic notebook including associated categories, for each electronic notebook the categories provided including:
        a comment category that includes general notes;
        a status category that includes a status of the project; and
        a published notes category, the method including publishing notes in the published notes category to a team working on the project; and
    wherein each of the plurality of documents is associated with an object, and the method further including maintaining a state of the object, the state of the object controlling whether documents associated with the object are modifiable, the at least one object being a bid; and
    the object is associated with multiple documents of the plurality of documents; and
    utilizing a table to contain the state of the object, along with a plurality of other objects associated with other documents; and
    maintaining a history of revisions to the objects, such that chances in state of the object during the approval process is maintained for auditing purposes.

2. The method of claim 1, wherein accessing the document collection in the database by the vendor is controlled by access rights, which include a password.

3. The method of claim 1, wherein the vendor determining that approval for the project has been secured through access to the document collection is effected by the vendor reviewing an electronic copy of a purchase order.

4. The method of claim 3, wherein the vendor accesses payment confirmations via the processing system.

5. The method of claim 3, wherein the purchase order is issued to the vendor electronically.

6. The method of claim 5, wherein the purchase order is issued to the vendor electronically, with a notification being made to a project manager.

7. The method of claim 1, wherein the contract further provides for the issuance of change orders by a project manager.

8. The method of claim 1, wherein the project is assigned a project number, which is associated with the document collection.

9. The method of claim 1, wherein the funding approval is part of a Request for Assistance initiated by a client.

10. The method of claim 1, wherein the method further includes soliciting work from the vendors using the processing system.

11. The method of claim 1, wherein the processing system provides for accessing a listing of Request for Assistance associated with a particular business unit.

12. The method of claim 1, wherein the processing system provides for a user to access all funding documents for projects on which the user is involved.

13. The method of claim 1, wherein a review entity provides an evaluation of an offer extended by a vendor.

14. The method of claim 13, wherein the review entity is a project manager and the offer extended by a vendor is a bid.

15. The method of claim 1, wherein the funding approval is effected by a client hierarchy.

16. The method of claim 1, wherein the vendor is a construction entity.

17. The method of claim 1, further including organizing the document collection into a variety of tree structures for viewing, one of the tree structures displaying all the documents that a user has approved within a predetermined period of time.

18. The method of claim 1, the construction project being a contract and document collection including contract documents.

19. The method of claim 1 wherein the construction project is engineering related.

20. The method of claim 1, wherein the construction project is architectural related.

21. A processing system for managing a construction project, the processing system performing:
  establishing a database in the processing system, the processing system maintained by a project management entity;
  providing funding approval associated with the project through a funding approval process, the funding approval being effected in association with a document collection associated with the project, the document collection maintained in the database, the document collection including a plurality of documents;
  performing the funding approval process for the project in the processing system, the funding approval process including:
    identifying approvers that comprise an approval hierarchy, the approval hierarchy being a series of approvers;
    automatically forwarding a notice requesting approval of at least one electronic document, in the document collection, from a previous approver to a successive one of the approvers upon approval of the at least one electronic document by the previous approver in the approval hierarchy; and
  wherein the successive one of the approvers returns the funding approval to the previous approver, the previous approver not being the requester, the successive one of the approvers returns the funding approval to a requestor;
  accessing the document collection in the database by a vendor;
  the vendor entering and submitting electronically information related to the project;
  the vendor determining that funding approval for the project has been secured through access to the document collection; and
  transferring monetary funds to the vendor after a predetermined event has occurred;
  wherein the predetermined event is the completion of a portion of the project associated with the vendor, and upon completion of the portion of the project associated with the vendor, the vendor submits an invoice via the system, wherein the invoice is electronically transmitted from a vendor workstation;
  obtaining an invoice from each vendor once the respective vendor's portion of the project is completed;
  subsequent to submission of the invoice by the vendor, a payment associated with the invoice goes through a validation process and is charged against portions of a contract associated with the project;
  providing a contract to the vendor, the contract defining tasks to be performed by the vendor, the contract included in the document collection;
  generating, by the processing system, a list of all projects associated with a particular user, each of the projects associated with a document collection;
  wherein each of the plurality of documents in the document collection being associated with a respective electronic notebook, the documents in the document collection being electronic documents, each electronic notebook including associated categories, for each electronic notebook the categories provided including:
    a comment category that includes general notes;
    a status category that includes a status of the project; and
    a published notes category, the method including publishing notes in the published notes category to a team working on the project; and
  each of the plurality of documents is associated with an object, and the method further including maintaining a state of the object, the state of the object controlling whether documents associated with the object are modifiable, the at least one object being a bid;
  the object is associated with multiple documents of the plurality of documents; and
  utilizing a table to contain the state of the object, along with a plurality of other objects associated with other documents; and
  maintaining a history of revisions to the objects, such that changes in state of the object during the approval process is maintained for auditing purposes.

* * * * *